United States Patent
Allen et al.

(10) Patent No.: US 11,927,791 B2
(45) Date of Patent: Mar. 12, 2024

(54) BACKLIGHTS INCLUDING PATTERNED REFLECTORS

(71) Applicant: Corning Incorporated, Corning, NY (US)

(72) Inventors: Kirk Richard Allen, Elmira, NY (US); David Lynn Baker, Painted Post, NY (US); Songfeng Han, Shanghai (CN); Dmitri Vladislavovich Kuksenkov, Elmira, NY (US); Pamela Arlene Maurey, Savona, NY (US); Xiang-Dong Mi, Pittsford, NY (US); Timothy James Orsley, San Jose, CA (US); Andrii Varanytsia, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/759,941

(22) PCT Filed: Feb. 2, 2021

(86) PCT No.: PCT/US2021/016159
§ 371 (c)(1),
(2) Date: Aug. 2, 2022

(87) PCT Pub. No.: WO2021/162889
PCT Pub. Date: Aug. 19, 2021

(65) Prior Publication Data
US 2023/0124292 A1 Apr. 20, 2023

Related U.S. Application Data

(60) Provisional application No. 62/972,312, filed on Feb. 10, 2020.

(51) Int. Cl.
F21V 8/00 (2006.01)

(52) U.S. Cl.
CPC ......... G02B 6/0055 (2013.01); G02B 6/0051 (2013.01)

(58) Field of Classification Search
CPC .......................... G02B 6/0055; G02B 6/0051
See application file for complete search history.

(56) References Cited

U.S. PATENT DOCUMENTS

| 7,183,001 B1 | 2/2007 | Ederle et al. |
| 8,272,772 B2 | 9/2012 | Sato et al. |

(Continued)

FOREIGN PATENT DOCUMENTS

| EP | 2700998 A1 | 2/2014 |
| FR | 2836477 A1 | 8/2003 |

(Continued)

OTHER PUBLICATIONS

International Search Report and Written Opinion of the International Searching Authority; PCT/US2021/016159; dated May 24, 2021; 11 pages; European Patent Office.

*Primary Examiner* — Anne M Hines
(74) *Attorney, Agent, or Firm* — Matthew J. Mason

(57) ABSTRACT

A backlight includes a substrate, a plurality of light sources proximate the substrate, a first reflective layer on the substrate, and a plurality of patterned reflectors over the plurality of light sources. Each light source includes a size measured in a plane parallel to the substrate. Each patterned reflector is aligned with a corresponding light source and includes a thickness profile. The thickness profile includes a substantially flat section and a curved section extending from and surrounding the substantially flat section. The substantially flat section varies in thickness by no more than plus or minus 20 percent of an average thickness of the substantially flat section. The substantially flat section (Continued)

includes a size in a plane parallel to the substrate equal to or greater than the size of each light source.

25 Claims, 16 Drawing Sheets

(56) References Cited

U.S. PATENT DOCUMENTS

| | | |
|---|---|---|
| 9,081,229 B2 | 7/2015 | Sato et al. |
| 2006/0290844 A1* | 12/2006 | Epstein ............ G02F 1/133615 349/113 |
| 2009/0262280 A1 | 10/2009 | Kwon |
| 2010/0167011 A1 | 7/2010 | Dubrow |
| 2012/0275139 A1* | 11/2012 | Chen .................... G02B 6/0025 362/97.2 |
| 2015/0159834 A1 | 6/2015 | Chang |
| 2016/0018570 A1 | 1/2016 | Chang et al. |
| 2017/0123134 A1 | 5/2017 | Moon et al. |
| 2020/0019019 A1 | 1/2020 | Liu et al. |
| 2020/0257035 A1 | 8/2020 | Kuksenkov et al. |
| 2021/0397049 A1 | 12/2021 | Allen et al. |

FOREIGN PATENT DOCUMENTS

| | | |
|---|---|---|
| JP | 2009-053622 A | 3/2009 |
| KR | 10-2013-0071014 A | 6/2013 |
| TW | 201602661 A | 1/2016 |
| WO | 2004/090587 A1 | 10/2004 |
| WO | 2010/047557 A2 | 4/2010 |
| WO | 2011/105459 A1 | 9/2011 |
| WO | 2018/129909 A1 | 7/2018 |
| WO | 2018/144509 A1 | 8/2018 |
| WO | 2019/040686 A1 | 2/2019 |
| WO | 2019/046223 A1 | 3/2019 |
| WO | 2019/046328 A1 | 3/2019 |
| WO | 2020/214047 A1 | 10/2020 |
| WO | 2021/071375 A1 | 4/2021 |

* cited by examiner

BACKLIGHTS INCLUDING PATTERNED REFLECTORS

CROSS-REFERENCE TO RELATED APPLICATIONS

This Application claims the benefit of priority under 35 U.S.C. § 371 of International Application Serial No.: PCT/US2021/016159, filed on Feb. 2, 2021, which claims the benefit of priority under 35 USC § 119 from U.S. Provisional Patent Application Ser. No. 62/972,312, filed on Feb. 10, 2020, the contents of which are relied upon and incorporated by reference herein in their entirety.

BACKGROUND

Field

The present disclosure relates generally to backlights for displays. More particularly, it relates to backlights including patterned reflectors and/or a diffusive layer.

Technical Background

Liquid crystal displays (LCDs) are commonly used in various electronics, such as cell phones, laptops, electronic tablets, televisions, and computer monitors. LCDs are light valve-based displays in which the display panel includes an array of individually addressable light valves. LCDs may include a backlight for producing light that may then be wavelength converted, filtered, and/or polarized to produce an image from the LCD. Backlights may be edge-lit or direct-lit. Edge-lit backlights may include a light emitting diode (LED) array edge-coupled to a light guide plate that emits light from its surface. Direct-lit backlights may include a two-dimensional (2D) array of LEDs directly behind the LCD panel.

Direct-lit backlights may have the advantage of improved dynamic contrast as compared to edge-lit backlights. For example, a display with a direct-lit backlight may independently adjust the brightness of each LED to set the dynamic range of the brightness across the image. This is commonly known as local dimming. To achieve desired light uniformity and/or to avoid hot spots in direct-lit backlights, however, a diffuser plate or film may be positioned at a distance from the LEDs, thus making the overall display thickness greater than that of an edge-lit backlight. Lenses positioned over the LEDs have been used to improve the lateral spread of light in direct-lit backlights. The optical distance (OD) between the LEDs and the diffuser plate or film in such configurations (e.g., from at least 10 to typically about 20-30 millimeters), however, still results in an undesirably high overall display thickness and/or these configurations may produce undesirable optical losses as the backlight thickness is decreased. While edge-lit backlights may be thinner, the light from each LED may spread across a large region of the light guide plate such that turning off individual LEDs or groups of LEDs may have only a minimal impact on the dynamic contrast ratio.

SUMMARY

Some embodiments of the present disclosure relate to a backlight. The backlight includes a substrate, a plurality of light sources proximate the substrate, a first reflective layer on the substrate, and a plurality of patterned reflectors over the plurality of light sources. Each light source includes a size measured in a plane parallel to the substrate. Each patterned reflector is aligned with a corresponding light source and includes a thickness profile. The thickness profile includes a substantially flat section and a curved section extending from and surrounding the substantially flat section. The substantially flat section varies in thickness by no more than plus or minus 20 percent of an average thickness of the substantially flat section. The substantially flat section includes a size in a plane parallel to the substrate equal to or greater than the size of each light source.

Yet other embodiments of the present disclosure relate to a backlight. The backlight includes a substrate, a plurality of light sources proximate the substrate, a first reflective layer on the substrate, and a plurality of patterned reflectors over the plurality of light sources. Each light source includes a size measured in a plane parallel to the substrate. Each patterned reflector is aligned with a corresponding light source and includes a first solid section, a plurality of second solid sections surrounding the first solid section, and a plurality of open sections interleaved with the plurality of second solid sections. The first solid section includes a size in a plane parallel to the substrate equal to or greater than the size of each light source.

Yet other embodiments of the present disclosure relate to a backlight. The backlight includes a substrate, a plurality of light sources proximate the substrate, a first reflective layer on the substrate, and a plurality of patterned reflectors over the plurality of light sources. Each light source includes a size measured in a plane parallel to the substrate. Each patterned reflector is aligned with a corresponding light source and includes a solid first section, a second section surrounding the solid first section, and a plurality of openings extending through the second section. The openings increase in size as a distance from a center of the solid first section increases. The solid first section includes a size in a plane parallel to the substrate equal to or greater than the size of each light source.

Yet other embodiments of the present disclosure relate to a backlight. The backlight includes a substrate, a plurality of light sources proximate the substrate, a light guide plate proximate the plurality of light sources, and a diffusive layer on the light guide plate. The diffusive layer includes hollow glass beads.

The backlights disclosed herein are thin direct-lit backlights with improved light efficiency. The backlights have an improved ability to hide light sources resulting in a thinner backlight. The improved ability to hide the light sources allows for the removal of so-called "hot" spots directly above the light sources of the backlight, thus resulting in a uniform brightness across the display.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description explain principles and operation of the various embodiments.

DETAILED DESCRIPTION

Figure 1A:
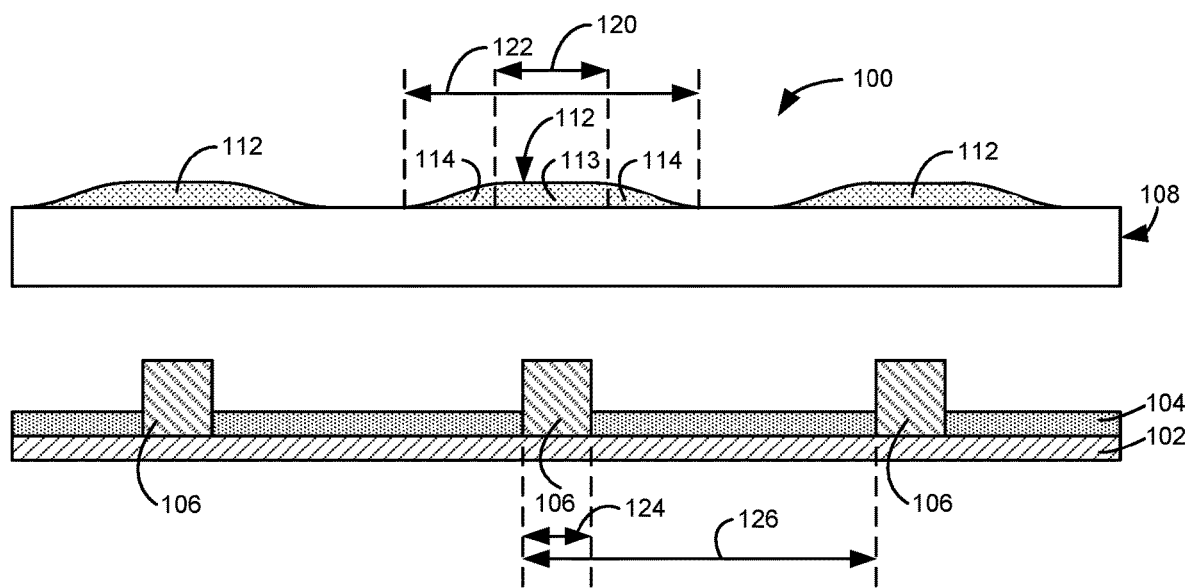
FIGS. 1A-1C are various views of an exemplary backlight including patterned reflectors.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, vertical, horizontal—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

Figure 1B:
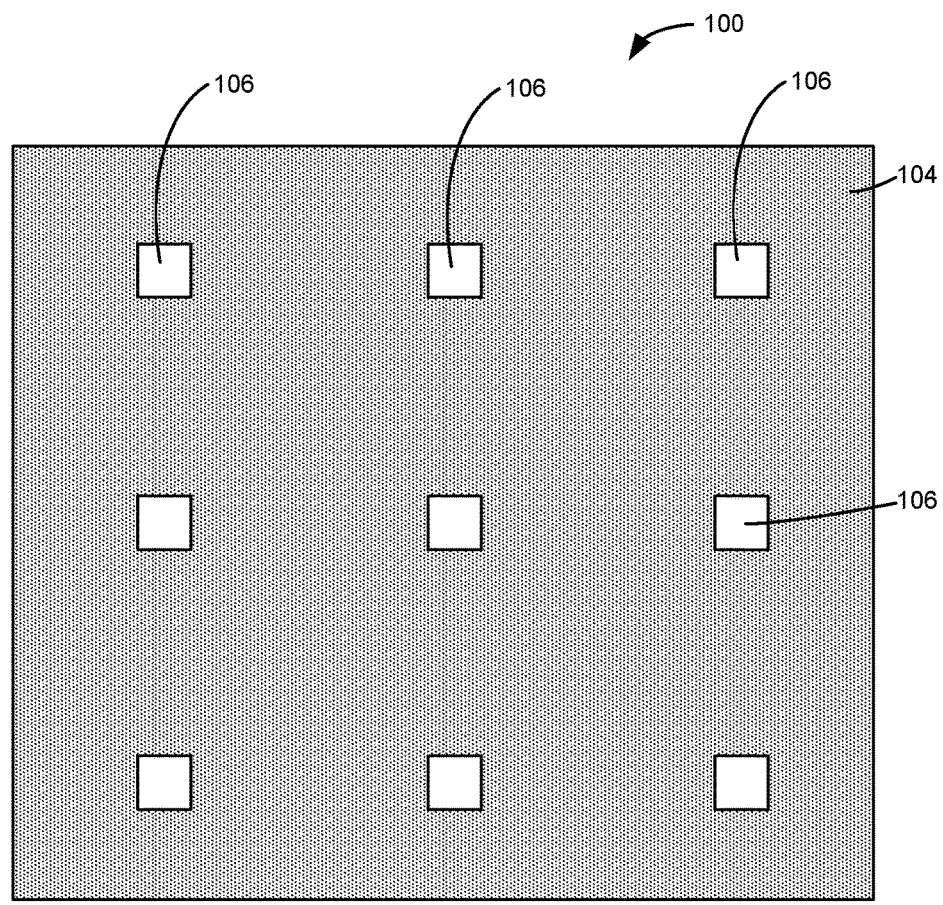
Figure 1C:
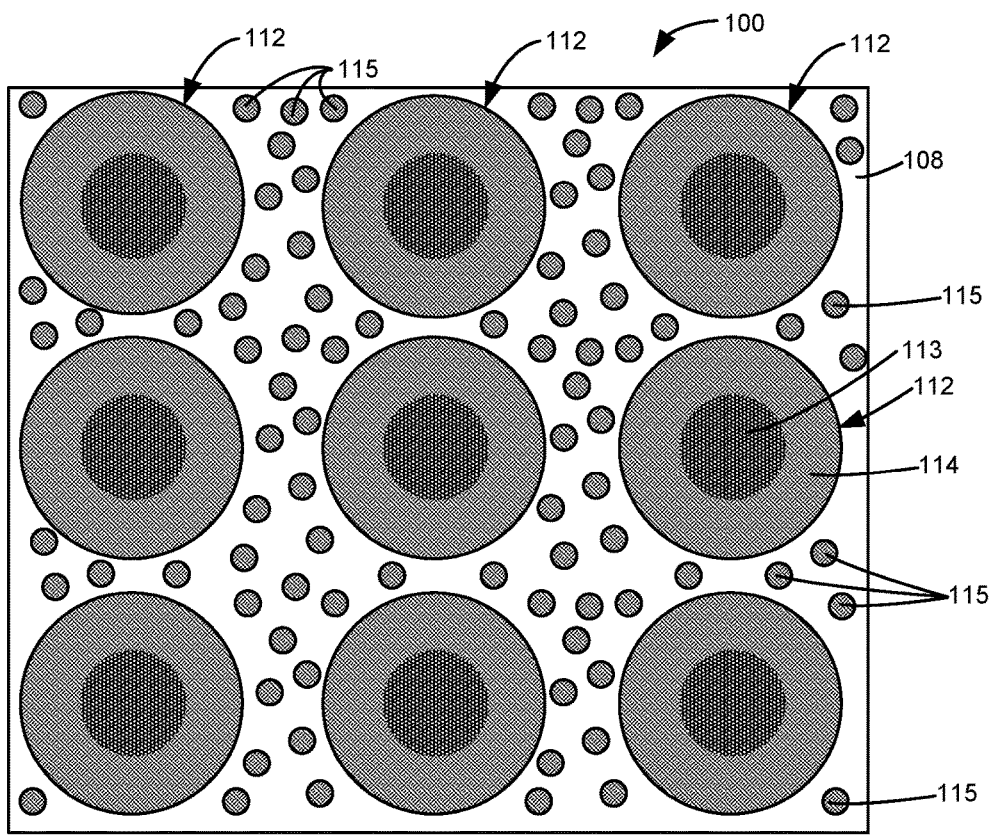

Referring now to FIGS. 1A-1C, various views of an exemplary backlight 100 are depicted. FIG. 1A is a cross-sectional view of backlight 100. Backlight 100 may include a substrate 102, a reflective layer 104, a plurality of light sources 106, a light guide plate 108, and a plurality of patterned reflectors 112. The plurality of light sources 106 are arranged on substrate 102 and are in electrical communication with the substrate 102. The reflective layer 104 is on the substrate 102 and surrounds each light source 106. In certain exemplary embodiments, the substrate 102 may be reflective such that the reflective layer 104 may be excluded. The light guide plate 108 is over the plurality of light sources 106 and optically coupled to each light source 106. In certain exemplary embodiments, an optical adhesive (not shown) may be used to couple the plurality of light sources 106 to the light guide plate 108. The optical adhesive (e.g., phenyl silicone) may have a refractive index greater than or equal to a refractive index of the light guide plate 108. The plurality of patterned reflectors 112 are arranged on the upper surface of the light guide plate 108. Each patterned reflector 112 is aligned with a corresponding light source 106.

Each patterned reflector 112 includes a thickness profile including a substantially flat section as indicated at 113 and a curved section as indicated at 114 extending from and surrounding the substantially flat section 113. The substantially flat section 113 may have a rough surface profile. In certain exemplary embodiments, the substantially flat section 113 varies in thickness by no more than plus or minus 20 percent of an average thickness of the substantially flat section. In this embodiment, the average thickness (measured in the direction orthogonal to the light guide plate 108) is defined as the maximum thickness ($T_{max}$) of the substantially flat section plus the minimum thickness ($T_{min}$) of the substantially flat section divided by two (i.e., ($T_{max}+T_{min}$)/2). For example, for an average thickness of the substantially flat section 113 of about 100 micrometers, the maximum thickness of the substantially flat section would be equal to or less than about 120 micrometers and the minimum thickness of the substantially flat section would be equal to or greater than about 80 micrometers. In other embodiments, the substantially flat section 113 varies in thickness by no more than plus or minus 15 percent of an average thickness of the substantially flat section. For example, for an average thickness of the substantially flat section 113 of about 80 micrometers, the maximum thickness of the substantially flat section would be equal to or less than about 92 micrometers and the minimum thickness of the substantially flat section would be equal to or greater than about 68 micrometers. In yet other embodiments, the substantially flat section 113 varies in thickness by no more than plus or minus 10 percent of an average thickness of the substantially flat section. For example, for an average thickness of the substantially flat section 113 of about 50 micrometers, the maximum thickness of the substantially flat section would be equal to or less than about 55 micrometers and the minimum thickness of the substantially flat section would be equal to or greater than about 45 micrometers. The curved section 114 may be defined as the absolute ratio of the change in thickness over the change in the distance from the center of the patterned reflector 112. The slope of the curved section 114 may decrease with the distance from the center of the patterned reflector 112. In certain exemplary embodiments, the slope is highest near the substantially flat section 113, rapidly decreases with the distance from the center of the patterned reflector 112, and then slowly decreases with further distance from the center of the patterned reflector.

The size L0 (i.e., width or diameter) of each substantially flat section 113 as indicated at 120 (in a plane parallel to the substrate 102) may be greater than the size (i.e., width or diameter) of each corresponding light source 106 as indicated at 124 (in a plane parallel to the substrate 102). The size 120 of each substantially flat section 113 may be less than the size 124 of each corresponding light source 106 times a predetermined value. In certain exemplary embodiments, when the size 124 of the each light source 106 is greater than or equal to about 0.5 millimeters, the predetermined value may be about two or about three, such that the size of each substantially flat section 113 is less than three times the size of each light source 106. When the size 124 of each light source 106 is less than 0.5 millimeters, the predetermined value may be determined by the alignment capability between the light sources 106 and the patterned reflectors 112, such that the size of each substantially flat section 113 of each of patterned reflector 112 is within a range between about 100 micrometers and about 300 micrometers greater than the size of each light source 106. Each substantially flat section 113 is large enough such that each patterned reflector 112 can be aligned to the corresponding light source 106 and small enough to achieve suitable luminance uniformity and color uniformity.

The size L1 (i.e., width or diameter) of each patterned reflector 112 is indicated at 122 (in a plane parallel to the substrate 102) and the pitch P between adjacent light sources 106 is indicated at 126. While the pitch is illustrated along one direction in FIG. 1A, it is noted that the pitch may be different in a direction orthogonal to the direction illustrated. The pitch may, for example, be about 90, 45, 30, 10, 5, 2, 1, or 0.5 millimeters, larger than about 90 millimeters, or smaller than about 0.5 millimeters. In certain exemplary embodiments, the ratio L1/P of the size 122 of each patterned reflector 112 over the pitch 126 is within a range between about 0.45 and 1.0. The ratio may vary with the pitch 126 of the light sources 106 and the distance between the emission surface of each light source and the corresponding patterned reflector 112. For example, for a pitch 126 equal to about 5 millimeters and a distance between the emission surface of each light source and the corresponding patterned reflector equal to about 0.2 millimeters, the ratio may equal about 0.50, 0.60, 0.70, 0.80, 0.90, or 1.0.

Each patterned reflector 112 reflects at least a portion of the light emitted from the corresponding light source 106 into the light guide plate 108. Each patterned reflector 112 has a specular reflectance and a diffuse reflectance. The specularly reflected light exits from the bottom surface of the light guide plate 108. While this light travels laterally primarily due to the reflection between the reflective layer 104 and the light guide plate 108, or due to the reflection between the reflective layer 104 and the quantum dot film, diffuser sheet, or diffuser plate (shown below in FIG. 2), some loss of light may occur due to imperfect reflection from the reflective layer 104.

The diffusively reflected light has an angular distribution between 0° and 90° measured from the normal of the light guide plate 108. About 50 percent of the diffusively reflected light has an angle exceeding the critical angle ($\theta_{TIR}$) of the total internal reflection. Thus, this light can travel laterally due to the total internal reflection without any loss, until the light is subsequently extracted out of the light guide plate 108 by patterned reflectors 112.

FIG. 1B is a top view of the plurality of light sources 106 and reflective layer 104 on substrate 102. Light sources 106 are arranged in a 2D array including a plurality of rows and a plurality of columns. While nine light sources 106 are illustrated in FIG. 1B in three rows and three columns, in other embodiments backlight 100 may include any suitable number of light sources 106 arranged in any suitable number of rows and any suitable number of columns. Light sources 106 may also be arranged in other periodic patterns, for example, a hexagonal or triangular lattice, or as quasi-periodic or non-strictly periodic patterns. For example, the spacing between light sources 106 may be smaller at the edges and/or corners of the backlight.

Substrate 102 (FIG. 1A) may be a printed circuit board (PCB), a glass or plastic substrate, or another suitable substrate for passing electrical signals to each light source 106 for individually controlling each light source. Substrate 102 may be a rigid substrate or a flexible substrate. For example, substrate 102 may include flat glass or curved glass. The curved glass, for example, may have a radius of curvature less than about 2000 millimeters, such as about 1500, 1000, 500, 200, or 100 millimeters. The reflective layer 104 may include, for example, metallic foils, such as silver, platinum, gold, copper, and the like; dielectric materials (e.g., polymers such as polytetrafluoroethylene (PTFE)); porous polymer materials, such as polyethylene terephthalate (PET), Poly(methyl methacrylate) (PMMA), polyethylene naphthalate (PEN), polyethersulfone (PES), etc.; multi-layer dielectric interference coatings, or reflective inks, including white inorganic particles such as titania, barium sulfate, etc., or other materials suitable for reflecting light and tuning the color of the reflected and transmitted light, such as colored pigments.

Each of the plurality of light sources 106 may, for example, be an LED (e.g., size larger than about 0.5 millimeters), a mini-LED (e.g., size between about 0.1 millimeters and about 0.5 millimeters), a micro-LED (e.g., size smaller than about 0.1 millimeter), an organic LED (OLED), or another suitable light source having a wavelength ranging from about 400 nanometers to about 750 nanometers. In other embodiments, each of the plurality of light sources may have a wavelength shorter than 400 nanometers and/or longer than 750 nanometers. The light from each light source 106 is optically coupled to the light guide plate 108. As used herein, the term "optically coupled" is intended to denote that a light source is positioned at a surface of the light guide plate 108 and is in an optical communication with the light guide plate 108 directly or through an optically clear adhesive, so as to introduce light into the light guide plate that at least partially propagates due to total internal reflection. The light from each light source 106 is optically coupled to the light guide plate 108 such that a first portion of the light travels laterally in the light guide plate 108 due to the total internal reflection and is extracted out of the light guide plate by the patterned reflectors 112, and a second portion of the light travels laterally between the reflective layer 104 and the patterned reflectors 112 due to multiple reflections at the reflective surfaces of the reflective layer 104 and the patterned reflectors 112 or between an optical film stack (shown in FIG. 2) and the reflective layer 104.

According to various embodiments, the light guide plate 108 may include any suitable transparent material used for lighting and display applications. As used herein, the term "transparent" is intended to denote that the light guide plate has an optical transmission of greater than about 70 percent over a length of 500 millimeters in the visible region of the spectrum (about 420-750 nanometers). In certain embodiments, an exemplary transparent material may have an optical transmittance of greater than about 50 percent in the ultraviolet (UV) region (about 100-400 nanometers) over a length of 500 millimeters. According to various embodiments, the light guide plate may include an optical transmittance of at least 95 percent over a path length of 50 millimeters for wavelengths ranging from about 450 nanometers to about 650 nanometers.

The optical properties of the light guide plate may be affected by the refractive index of the transparent material. According to various embodiments, the light guide plate 108 may have a refractive index ranging from about 1.3 to about 1.8. In other embodiments, the light guide plate 108 may have a relatively low level of light attenuation (e.g., due to absorption and/or scattering). The light attenuation (a) of the light guide plate 108 may, for example, be less than about 5 decibels per meter for wavelengths ranging from about 420-750 nanometers. The light guide plate 108 may include polymeric materials, such as plastics (e.g., polymethyl methacrylate (PMMA), methylmethacrylate styrene (MS), polydimethylsiloxane (PDMS)), polycarbonate (PC), or other similar materials. The light guide plate 108 may also include a glass material, such as aluminosilicate, alkali-aluminosilicate, borosilicate, alkali-borosilicate, alumino-borosilicate, alkali-aluminoborosilicate, soda lime, or other suitable glasses. Non-limiting examples of commercially available glasses suitable for use as a glass light guide plate 108 include EAGLE XG®, Lotus™, Willow®, Iris™, and Gorilla® glasses from Corning Incorporated. In examples where substrate 102 includes curved glass, light guide plate 108 may also include curved glass to form a curved backlight.

FIG. 1C is a top view of the plurality of patterned reflectors 112 on the light guide plate 108. Each patterned reflector 112 may include a substantially flat section 113 and a curved section 114. In addition, each patterned reflector 112 may include individual dots 115 on the light guide plate 108. The substantially flat section 113 may be more reflective than the curved section 114, and the curved section 114 may be more transmissive than the substantially flat section 113. Each curved section 114 may have properties that change in a continuous and smooth way with distance from the substantially flat section 113. While in the embodiment illustrated in FIG. 1C, each patterned reflector 112 is circular in shape, in other embodiments each patterned reflector 112 may have another suitable shape (e.g., rectangular, hexagonal, etc.). With the patterned reflectors 112 fabricated directly on the upper surface of the light guide plate 108, the patterned reflectors 112 increase the ability of hiding the light sources 106. Fabricating patterned reflectors 112 directly on the upper surface of the light guide plate 108 also saves space.

In certain exemplary embodiments, each patterned reflector 112 is a diffuse reflector, such that each patterned reflector 112 further enhances the performance of the backlight 100 by scattering some light rays at high enough angles such that they can propagate in the light guide plate 108 by total internal reflection. Such rays will then not experience multiple bounces between the patterned reflectors 112 and the reflective layer 104 or between an optical film stack and the reflective layer 104 and therefore avoid loss of optical power, thereby increasing the backlight efficiency. In certain exemplary embodiments, each patterned reflector 112 is a specular reflector. In other embodiments, some areas of each patterned reflector 112 have a more diffuse character of reflectivity and some areas have a more specular character of reflectivity.

Each patterned reflector 112 may be formed, for example, by printing (e.g., inkjet printing, screen printing, microprinting, etc.) a pattern with white ink, black ink, metallic ink, or other suitable ink. Each patterned reflector 112 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal.

In certain exemplary embodiments where white light sources 106 are used, the presence of different reflective and absorptive materials in variable density in the patterned reflectors 112 may be beneficial for minimizing the color shift across each of the dimming zones of the backlight. Multiple bounces of light rays between the patterned reflectors and the reflective layer 104 (FIG. 1A) may cause more loss of light in the red part of the spectrum than in the blue, or vice versa. In this case, engineering the reflection to be color neutral, for example by using slightly colored reflective/absorptive materials, or materials with the opposite sign of dispersion (in this case, dispersion means spectral dependence of the reflection and/or absorption) may minimize the color shift.

Figure 2:
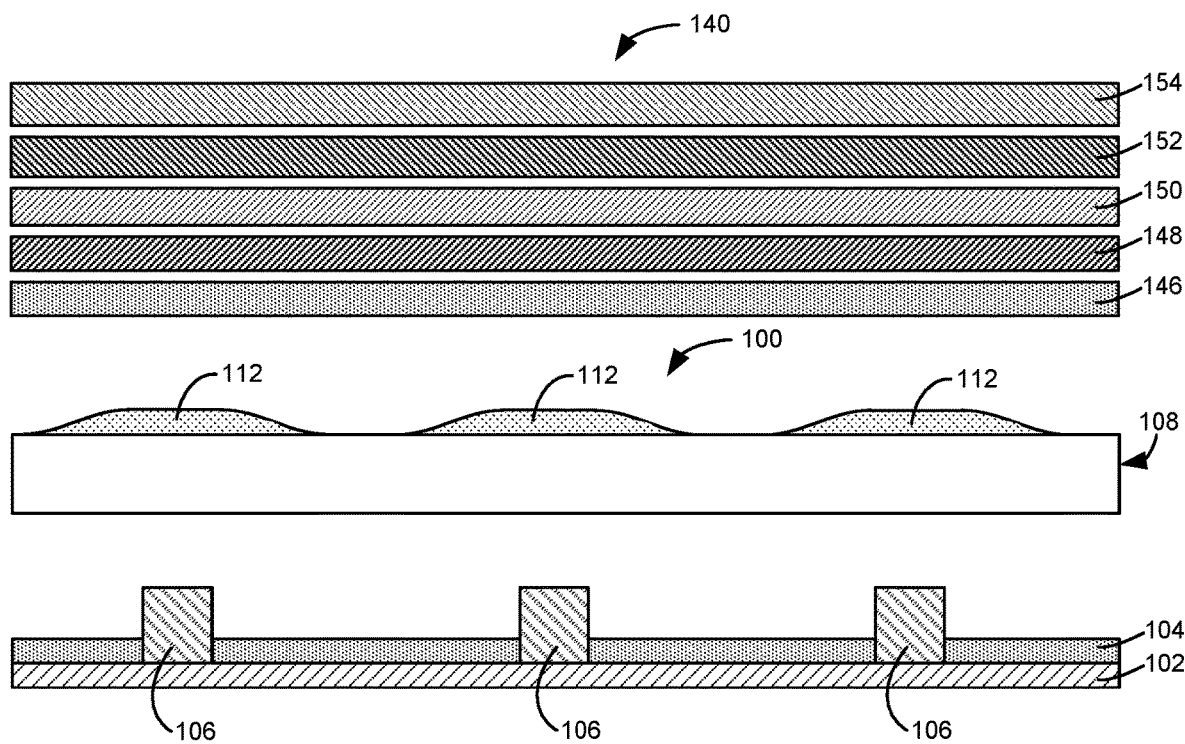
FIG. 2 is a cross-sectional view of an exemplary liquid crystal display (LCD) including the exemplary backlight of FIGS. 1A-1C.

FIG. 2 is a cross-sectional view of an exemplary liquid crystal display (LCD) 140. LCD 140 includes a backlight 100 including patterned reflectors 112 as previously described and illustrated with reference to FIGS. 1A-1C. In addition, LCD 140 includes optionally a diffuser plate 146 over backlight 100, optionally a quantum dot film 148 over the diffuser plate 146, optionally a prismatic film 150 over the quantum dot film 148, optionally a reflective polarizer 152 over the prismatic film 150, and a display panel 154 over the reflective polarizer 152.

To maintain the alignment between the light sources 106 and the patterned reflectors 112 on the light guide plate 108 for the proper functioning of the backlight 100, it is advantageous if the light guide plate 108 and the substrate 102 are made of the same or similar type of material so that both the patterned reflectors 112 on the light guide plate 108 and the light sources 106 on the substrate 102 are registered well to each other over a large range of operating temperatures. In certain exemplary embodiments, the light guide plate 108 and the substrate 102 are made of the same plastic material. In other embodiments, the light guide plate 108 and the substrate 102 are made of the same type of glass.

An alternative solution to keep the light guide plate 108 and light sources 106 on the substrate 102 in alignment is to use a highly flexible substrate. The highly flexible substrate may be made of a polyimide or other high temperature resistant polymer film to allow component soldering. The highly flexible substrate may also be made of materials such as FR4 or fiberglass, but of a significantly lower thickness than usual. In certain exemplary embodiments, an FR4 material of 0.4 millimeters thickness may be used for substrate 102, which may be sufficiently flexible to absorb the dimensional changes resulting from changing operating temperatures.

Figure 3:
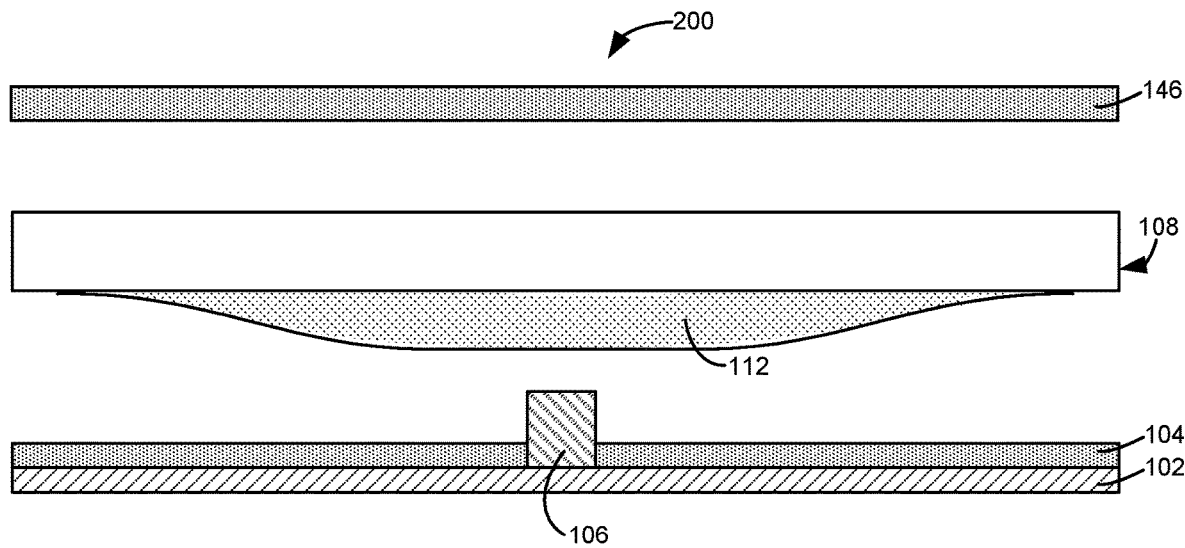
FIG. 3 is a cross-sectional view of an exemplary backlight including patterned reflectors.

FIG. 3 is a simplified cross-sectional view of an exemplary backlight 200. Backlight 200 is similar to backlight 100 previously described and illustrated with reference to FIGS. 1A-1C except that in backlight 200, each patterned reflector 112 faces the corresponding light source 106. While FIG. 3 illustrates a single light source 106 and a corresponding single patterned reflector 112 for simplicity, it will be understood that backlight 200 may include any suitable number of light sources 106 and corresponding patterned reflectors 112. Backlight 200 may include a substrate 102, a reflective layer 104, a plurality of light sources 106, a light guide plate 108, and a plurality of patterned reflectors 112 as previously described and illustrated with reference to FIGS. 1A-1C. Backlight 200 also includes the first layer 146 of an optical film stack (not shown) over the light guide plate 108. The first layer 146 of the optical film stack may include a diffuser plate, a quantum dot film, a prismatic film, or another suitable plate or film. In this embodiment, each patterned reflector 112 is on a first surface of the light guide plate 108, where the first surface of the light guide plate faces the plurality of light sources 106.

Figure 4:
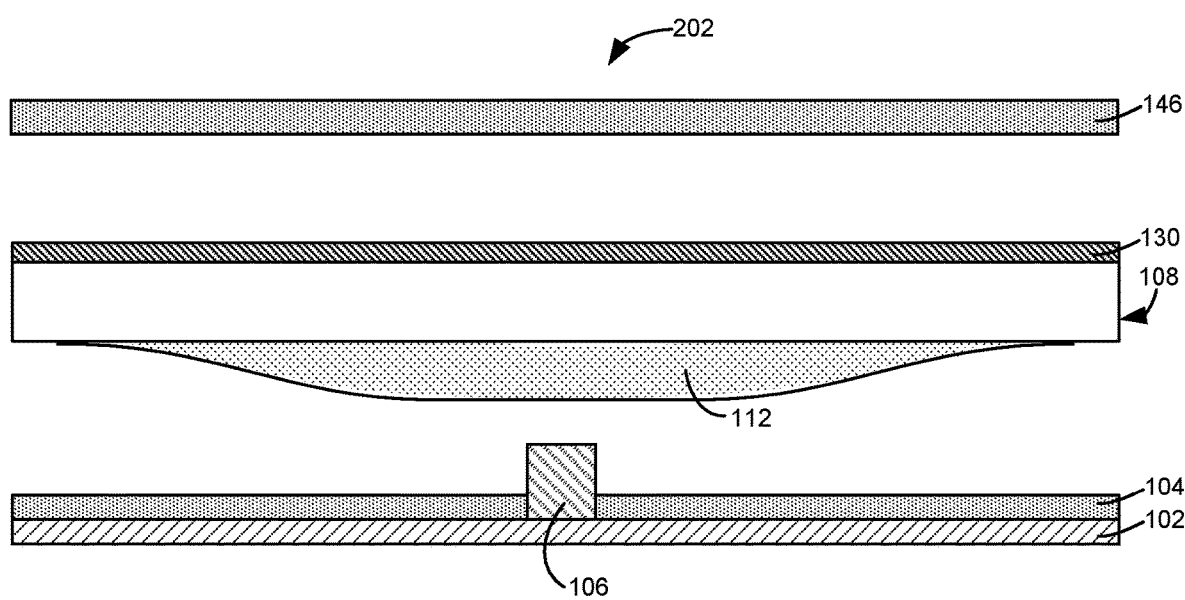
FIG. 4 is a cross-sectional view of an exemplary backlight including patterned reflectors and a diffusive layer.

FIG. 4 is a simplified cross-sectional view of an exemplary backlight 202. Backlight 202 is similar to backlight 200 previously described and illustrated with reference to FIG. 3. Backlight 202 may include a substrate 102, a reflective layer 104, a plurality of light sources 106, a light guide plate 108, and a plurality of patterned reflectors 112 as previously described and illustrated with reference to FIGS. 1A-1C. In addition, backlight 202 includes a diffusive layer 130. Backlight 202 also includes the first layer 146 of an optical film stack (not shown) over the diffusive layer 130.

Diffusive layer 130 is on a second surface of the light guide plate 108 opposite to the first surface of the light guide plate. Diffusive layer 130 faces away from the plurality of light sources 106. Diffusive layer 130 improves the lateral spreading of the light emitted from the light sources 106, thereby improving light uniformity. The diffusive layer 130 may have specular and diffuse reflectance and specular and diffuse transmittance. The specular reflectance or transmittance is the percent of reflected or transmitted light along the specular direction with 0 or 8 degrees depending on the measurement setup, while the diffuse reflectance or transmittance is the percent of reflected or transmitted light excluding the specular reflectance or transmittance. The diffusive layer 130 may have a haze and a transmittance. The diffusive layer 130 may have a haze, for example, of about 10, 20, 30, 40, 50, 60, 70, 80, 90, 95, or 99 percent or higher, and a transmittance of about 20, 30, 40, 50, 60, 70, 80, 90, or 95 percent or higher. In certain exemplary embodiments, the diffusive layer 130 has a haze of about 70 percent and a total transmittance of about 90 percent. In other embodiments, the diffusive layer 130 has a haze of about 88 percent and a total transmittance of about 96 percent. Haze is defined as the percent of transmitted light that is scattered so that its direction deviates more than 2.5 degrees from the direction of the incident beam, and transmittance is defined as the percent of transmitted light, per American Society for Testing and Materials (ASTM) D1003 "Standard Test Method for Haze and Luminous Transmittance of Transparent Plastics." Haze and transmittance can be measured by various haze meters.

Diffusive layer 130 diffuses rays from the light source 106. As a result, the patterned reflector 112 of backlight 202 may be thinner than a patterned reflector of a backlight not including diffusive layer 130 while still effectively hiding the light source 106. Diffusive layer 130 also diffuses rays that otherwise would undergo total internal reflection. In addition, diffusive layer 130 diffuses any rays that are reflected back by the quantum dot film, diffuser sheet, or diffuser plate 146. Thus, the diffusive layer 130 increases the light recycling effect caused by the quantum dot film, diffuser sheet, or diffuser plate 146 and any prismatic films (not shown) over the diffuser plate or diffuser sheet, such as one or two brightness enhancement films.

In certain exemplary embodiments, diffusive layer 130 includes a uniform or continuous layer of scattering particles. Diffusive layer 130 is considered to include a uniform layer of scattering particles where the distance between neighboring scattering particles is less than one fifth the size of the light source. Regardless of the location of diffusive layer 130 relative to the light source, diffusive layer 130 exhibits a similar diffusive property. The scattering particles may, for example, be within a clear or white ink that includes micro-sized or nano-sized scattering particles, such as alumina particles, $TiO_2$ particles, PMMA particles, or other suitable particles. The particle size may vary, for example, within a range from about 0.1 micrometers and about 10.0 micrometers. In other embodiments, diffusive layer 130 may include an anti-glare pattern. The anti-glare pattern may be formed of a layer of polymer beads or may be etched. In this embodiment, diffusive layer 130 may have a thickness, for example, of about 1, 3, 7, 14, 21, 28, or 50 micrometers, or another suitable thickness.

In certain exemplary embodiments, diffusive layer 130 may include a pattern that may be applied to the light guide plate 108 via screen printing. The diffusive layer 130 may be screen printed on a primer layer (e.g., an adhesive layer) applied to the light guide plate 108. In other embodiments, diffusive layer 130 may be applied to the light guide plate 108 by laminating the diffusive layer to the light guide plate via an adhesive layer. In yet other embodiments, diffusive layer 130 may be applied to the light guide plate 108 by embossing (e.g., thermal or mechanical embossing) the diffusive layer into the light guide plate, stamping (e.g., roller stamping) the diffusive layer into the light guide plate, or injection molding the diffusive layer. In yet other embodiments, diffusive layer 130 may be applied to the light guide plate 108 by etching (e.g., chemical etching) the light guide plate. In some embodiments, diffusive layer 130 may be applied to the light guide plate 108 with a laser (e.g., laser damaging).

In yet other embodiments, diffusive layer 130 may include a plurality of hollow beads. The hollow beads may be plastic hollow beads or glass hollow beads. The hollow beads, for example, may be glass bubbles available from 3M Company under the trade designations "3M GLASS BUBBLES iM30K". These glass bubbles have glass compositions including $SiO_2$ in a range from about 70 to about 80 percent by weight, alkaline earth metal oxide in a range from about 8 to about 15 percent by weight, and alkali metal oxide in a range from about 3 to about 8 percent by weight, and $B_2O_3$ in a range from about 2 to about 6 percent by weight, where each percent by weight is based on the total weight of the glass bubbles. In certain exemplary embodiments, the size (i.e., diameter) of the hollow beads may vary, for example, from about 8.6 micrometers to about 23.6 micrometers, with a median size of about 15.3 micrometers. In another embodiment, the size of the hollow beads may vary, for example, from about 30 micrometers to about 115 micrometers, with the median size of about 65 micrometers. In yet other embodiments, diffusive layer 130 may include a plurality of nano-sized color conversion particles such as red and/or green quantum dots. In yet other embodiments, diffusive layer 130 may include a plurality of hollow beads, nano-sized scattering particles, and nano-sized color conversion particles such as red and/or green quantum dots.

The hollow beads may first be uniformly mixed with a solvent (e.g., Methyl Ethyl Ketone (MEK)), subsequently mixed with any suitable binder (e.g., Methyl methacrylate and silica), and then fixed by thermal or ultraviolet (UV) curing if necessary to form a paste. The paste may then be deposited onto the surface of the light guide plate 108 through slot coating, screen printing, or any other suitable means to form the diffusive layer 130. In this embodiment, the diffusive layer 130 may have a thickness, for example, between about 10 micrometers and about 100 micrometers. In another example, the diffusive layer 130 may have a thickness between about 100 micrometers and about 300 micrometers. Multiple coatings may be used to form a thick diffusive layer if needed. In each example, the haze of the diffusive layer 130 may be more than 99 percent as measured with a haze meter such as BYK-Gardner's Haze-Gard. Two advantages of using hollow beads within diffusive layer 130 includes 1) reducing the weight of the diffusive layer 130; and 2) achieving a desired haze level at a small thickness.

Figure 5:
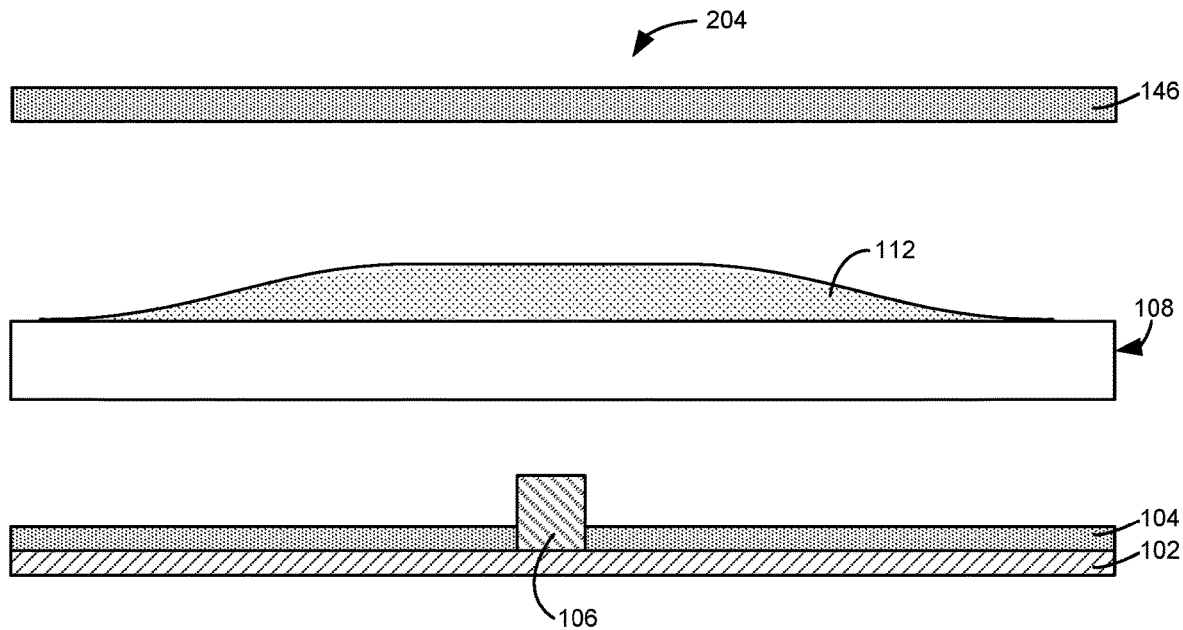
FIG. 5 is a cross-sectional view of another exemplary backlight including patterned reflectors.

FIG. 5 is a simplified cross-sectional view of another exemplary backlight 204. Backlight 204 is similar to backlight 100 previously described and illustrated with reference to FIGS. 1A-1C. For backlight 204, each patterned reflector 112 faces away from the corresponding light source 106. Backlight 204 may include a substrate 102, a reflective layer 104, a plurality of light sources 106, a light guide plate 108, and a plurality of patterned reflectors 112 as previously described and illustrated with reference to FIGS. 1A-1C. Backlight 204 also includes the first layer 146 of an optical film stack (not shown) over the light guide plate 108. Each patterned reflector 112 is on a first surface of the light guide plate 108, where the first surface of the light guide plate faces away from the plurality of light sources 106.

Figure 6:
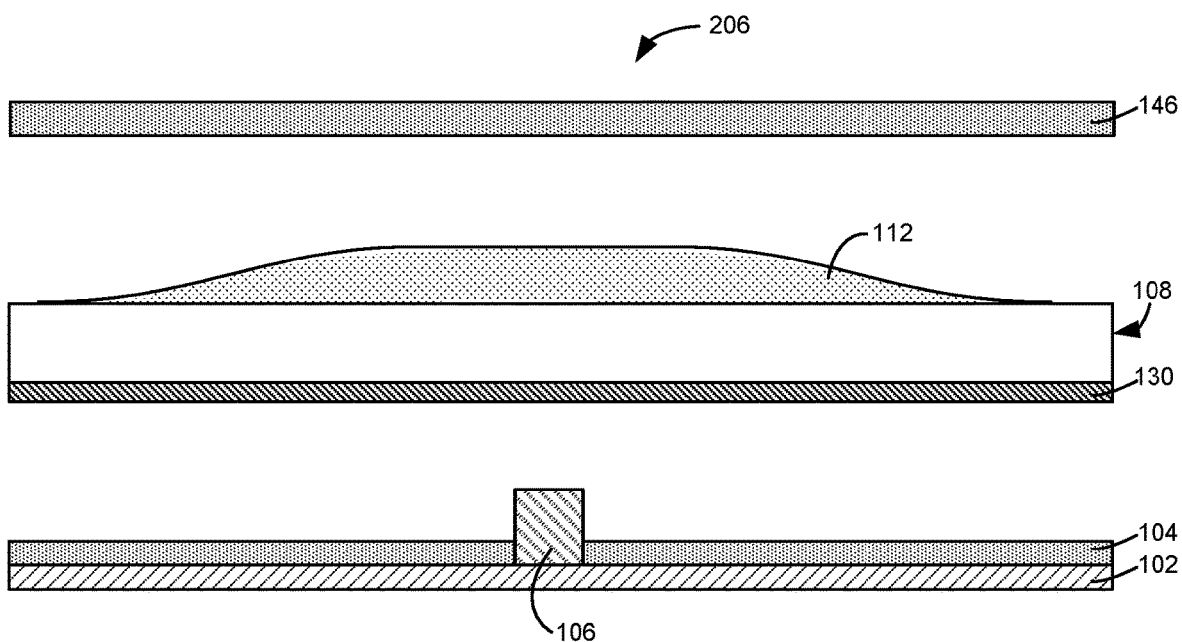
FIG. 6 is a cross-sectional view of another exemplary backlight including patterned reflectors and a diffusive layer.

FIG. 6 is a simplified cross-sectional view of another exemplary backlight 206. Backlight 206 is similar to backlight 204 previously described and illustrated with reference to FIG. 5. Backlight 206 may include a substrate 102, a reflective layer 104, a plurality of light sources 106, a light guide plate 108, and a plurality of patterned reflectors 112 as previously described and illustrated with reference to FIGS. 1A-1C. In addition, backlight 202 includes a diffusive layer 130. Backlight 206 also includes the first layer 146 of an optical film stack (not shown) over the plurality of patterned reflectors 112.

Diffusive layer 130 is on a second surface of the light guide plate 108 opposite to the first surface of the light guide plate. In this embodiment, the diffusive layer 130 faces the plurality of light sources 106 and the plurality of patterned reflectors 112 face away from the plurality of light sources 106. Diffusive layer 130 may include any of the features of diffusive layer 130 previously described with reference to FIG. 4.

Figure 7:
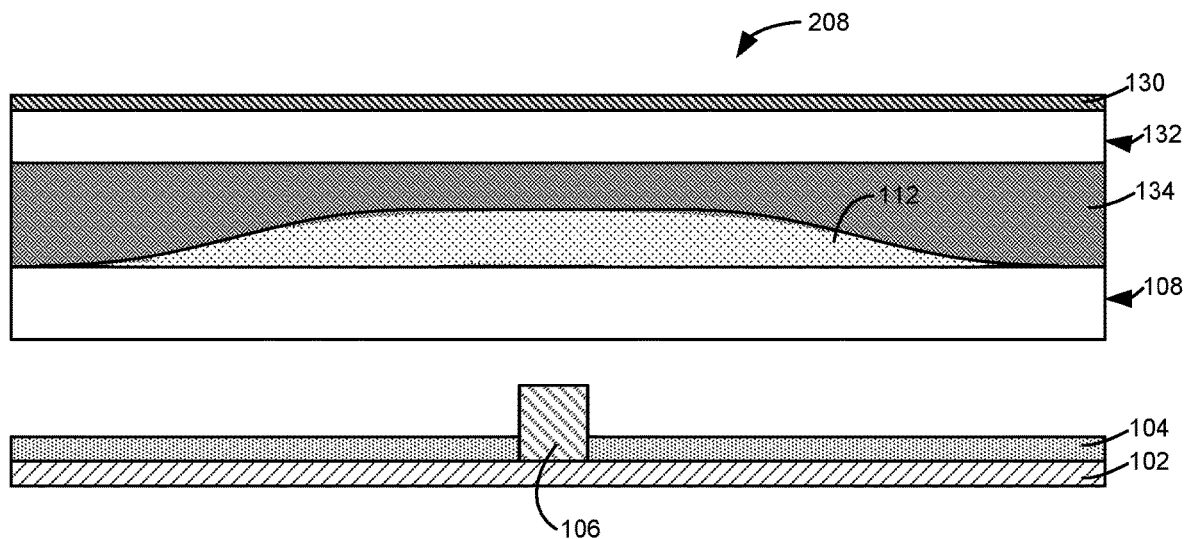
FIG. 7 is a cross-sectional view of another exemplary backlight including patterned reflectors and a diffusive layer.

FIG. 7 is a simplified cross-sectional view of another exemplary backlight 208. Backlight 208 may include a substrate 102, a reflective layer 104, a plurality of light sources 106, a first light guide plate 108, and a plurality of patterned reflectors 112 as previously described and illustrated with reference to FIGS. 1A-1C. In addition, backlight 208 includes a diffusive layer 130, a second light guide plate 132, and an adhesive layer 134. Diffusive layer 130 is on a first surface of the second light guide plate 132. A second surface of the second light guide plate 132 opposite to the first surface is coupled to the plurality of patterned reflectors 112 and the first light guide plate 108 via the adhesive layer 134. In this embodiment, the plurality of patterned reflectors 112 face away from the plurality of light sources 106 and are embedded in the adhesive material 134.

Diffusive layer 130 may include any of the features of diffusive layer 130 previously described with reference to FIG. 4. Adhesive layer 134 may include an optically clear adhesive (e.g., phenyl silicone) or another suitable material to bond the second light guide plate 132 to the plurality of patterned reflectors 112 and the first light guide plate 108. In certain exemplary embodiments, second light guide plate 132 may include any of the features of light guide plate 108 previously described with reference to FIGS. 1A-1C. Using a separate second light guide plate 132 upon which the diffusive layer 130 is formed, which is then bonded to the first light guide plate 108 enables additional flexibility in fabricating the diffusive layer 130 and the plurality of patterned reflectors 112. In addition, using a separate second light guide plate 132 enables the separate examination of the diffusive layer 130 on the second light guide plate 132 and the plurality of patterned reflectors 112 on the first light guide plate 108 prior to assembling backlight 208.

Figure 8:
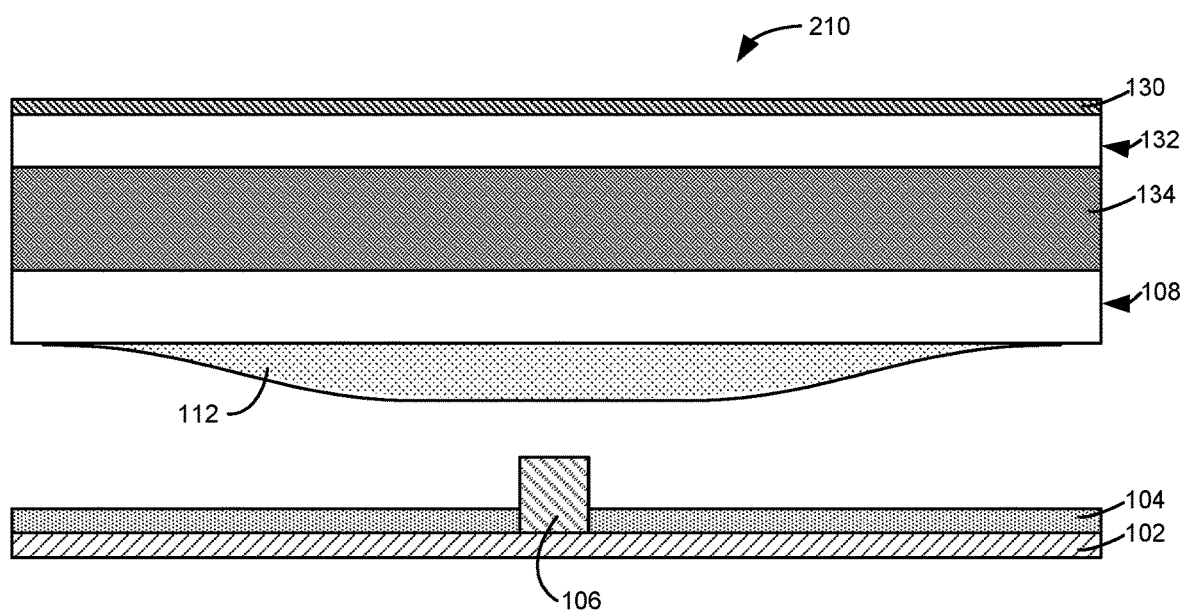
FIG. 8 is a cross-sectional view of another exemplary backlight including patterned reflectors and a diffusive layer.

FIG. 8 is a simplified cross-sectional view of another exemplary backlight 210. Backlight 210 may include a substrate 102, a reflective layer 104, a plurality of light sources 106, a first light guide plate 108, and a plurality of patterned reflectors 112 as previously described and illustrated with reference to FIGS. 1A-1C. In addition, backlight 202 includes a diffusive layer 130, a second light guide plate 132, and an adhesive layer 134 as previously described and illustrated with reference to FIG. 7. Diffusive layer 130 is on a first surface of the second light guide plate 132. A second surface of the second light guide plate 132 opposite to the first surface is coupled to the first light guide plate 108 via the adhesive layer 134. In this embodiment, the plurality of patterned reflectors 112 face the plurality of light sources 106. In other embodiments, the adhesive layer 134 may be excluded and the first light guide plate 108 may be separated from the second light guide plate 132 by an air gap.

Figure 9:
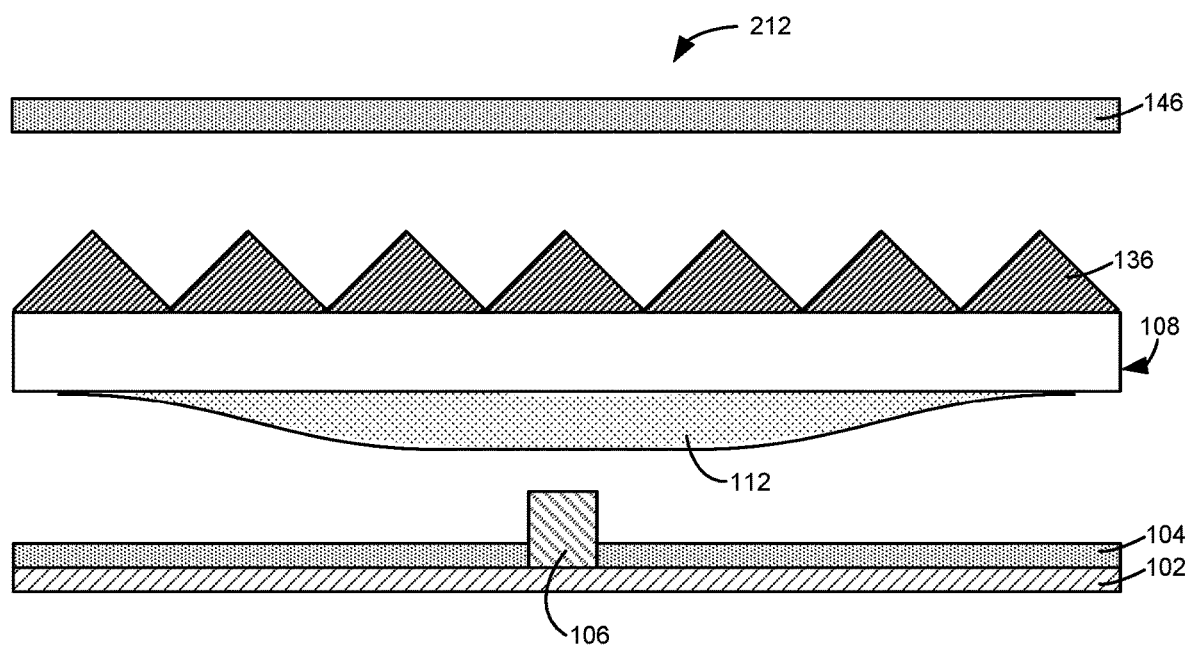
FIG. 9 is a cross-sectional view of an exemplary backlight including patterned reflectors and an optical component.

FIG. 9 is a simplified cross-sectional view of an exemplary backlight 212. Backlight 212 is similar to backlight 200 previously described and illustrated with reference to FIG. 3 except that backlight 212 includes an optical component 136. Backlight 212 may include a substrate 102, a reflective layer 104, a plurality of light sources 106, a light guide plate 108, and a plurality of patterned reflectors 112 as previously described and illustrated with reference to FIGS. 1A-1C. Backlight 212 also includes the first layer 146 of an optical film stack (not shown) over the optical component 136. Each patterned reflector 112 is on a first surface of the light guide plate 108, where the first surface of the light guide plate faces the plurality of light sources 106.

The optical component 136 is on a second surface of the light guide plate 108 opposite to the first surface, where the second surface of the light guide plate faces away from the plurality of light sources 106, such that the optical component 136 faces away from the plurality of light sources 106. The optical component 136 may include a quantum dot film, a prismatic or lenticular lens, or another suitable optical component. In the example of the prismatic or lenticular lens, the prismatic or lenticular lens may be linear or circular. The prismatic or lenticular lens may include nano-sized and/or micro-sized scattering particles as described above with reference to the diffusive layer 130. The micro-sized scattering particles can be hollow beads. The prismatic lens may have a rounded or sharp apex angle. In the example of the quantum dot film, by placing the quantum dot film directly on top of the light guide plate 108 the quantum dot film may be better protected from moisture and/or oxygen. The optical component 136 may be embedded in an adhesive material, and optionally be bonded to the adjacent optical component, for example, the first layer 146 of the optical film stack.

Figure 10A:
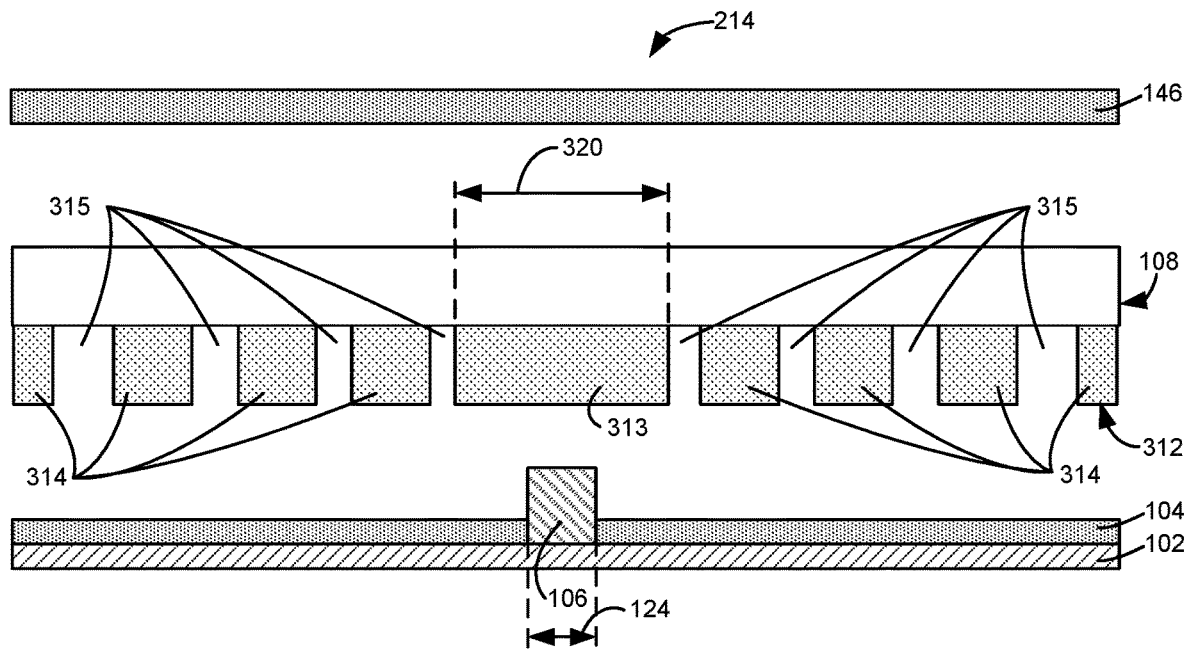
FIGS. 10A and 10B are various views of another exemplary backlight including patterned reflectors.
Figure 10B:
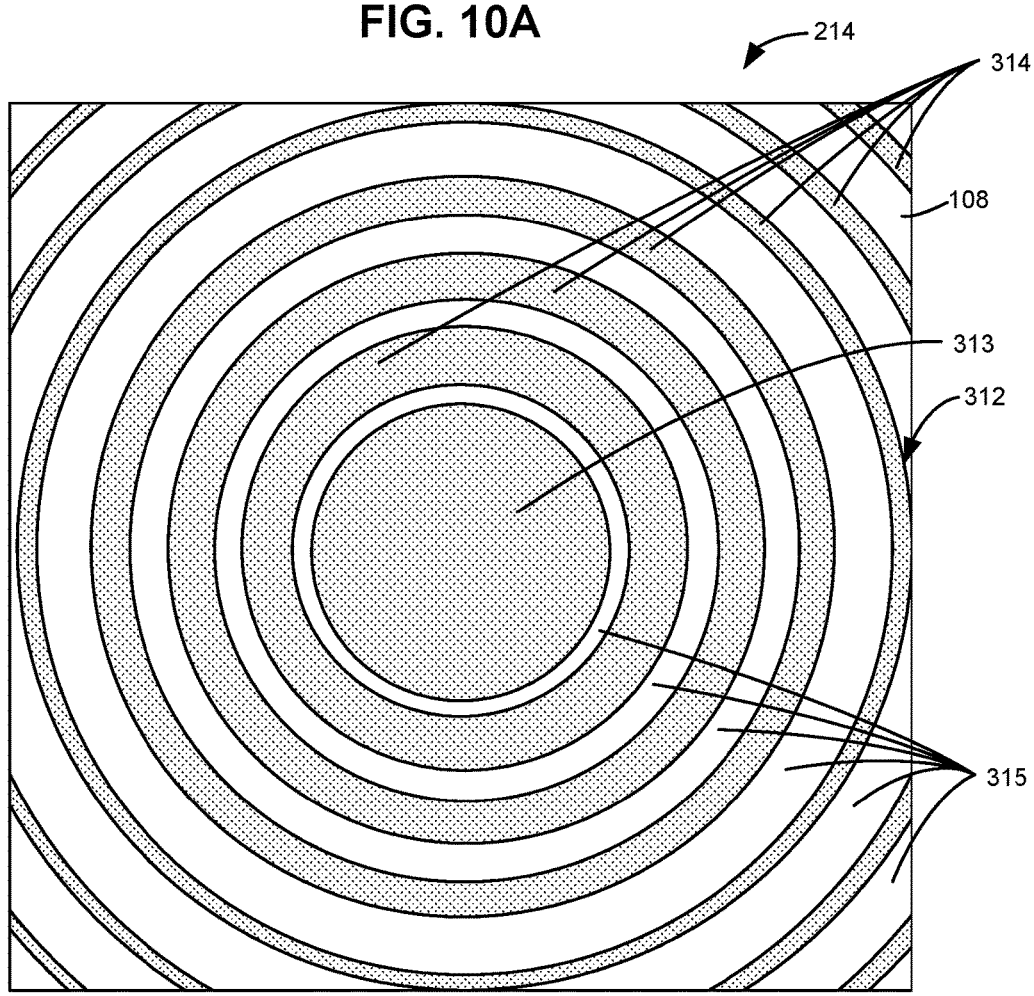

FIGS. 10A and 10B are various views of another exemplary backlight 214. FIG. 10A is a simplified cross-sectional view of backlight 214 and FIG. 10B is a bottom view of a patterned reflector 312 on a light guide plate 108. Backlight 214 is similar to backlight 200 previously described and illustrated with reference to FIG. 3, except that in backlight 214 patterned reflectors 312 are used in place of patterned reflectors 112. Backlight 214 may include a substrate 102, a reflective layer 104, a plurality of light sources 106, and a light guide plate 108 as previously described and illustrated with reference to FIGS. 1A-1C. Backlight 214 also includes the first layer 146 of an optical film stack (not shown) over the light guide plate 108.

Each patterned reflector 312 is on a first surface of the light guide plate 108, where the first surface of the light guide plate faces the plurality of light sources 106. In other embodiments, the first surface of the light guide plate 108 may face away from the plurality of light sources 106 such that the patterned reflectors 312 face away from the plurality of light sources 106. Each patterned reflector 312 includes a first solid section 313, a plurality of second solid sections 314 surrounding the first solid section 313, and a plurality of open sections 315 interleaved with the plurality of second solid sections 314. As illustrated in FIG. 10B, each second solid section 314 and each open section 315 may be ring-like, such as circular, elliptical, or another suitable shape.

Patterned reflector 312 includes a pattern of reflective material to create a variable diffusive reflector. The reflective material may include, for example, metallic foils, such as silver, platinum, gold, copper, and the like; dielectric materials (e.g., polymers such as PTFE); porous polymer materials, such as PET, PMMA, PEN, PES, etc., multi-layer dielectric interference coatings, or reflective inks, including white inorganic particles such as titania, barium sulfate, etc., or other materials suitable for reflecting light.

An area ratio $A(r)$ of each second solid section 314 may equal $As(r)/(As(r)+Ao(r))$, where r is the distance from the center of the corresponding patterned reflector 312, $As(r)$ is the area of the corresponding second section 314, and $Ao(r)$ is the area of the corresponding open section 315. The area ratio $A(r)$ of each second solid section 314 decreases with the distance r, and a rate of the decrease decreases with the distance r.

The size L0 (i.e., width or diameter) of each first solid section 313 as indicated at 320 (in a plane parallel to the substrate 102) may be greater than the size (i.e., width or diameter) of each corresponding light source 106 as indicated at 124 (in a plane parallel to the substrate 102). The size 320 of each first solid section 313 may be less than the size 124 of each corresponding light source 106 times a predetermined value. In certain exemplary embodiments, when the size 124 of the each light source 106 is greater than or equal to about 0.5 millimeters, the predetermined value may be about two or about three, such that the size of each first solid section 313 is less than three times the size of each light source 106. When the size 124 of each light source 106 is less than 0.5 millimeters, the predetermined value may be determined by the alignment capability between the light sources 106 and the patterned reflectors 312, such that the size of each first solid section 313 of each of patterned reflector 312 is within a range between about 100 micrometers and about 300 micrometers greater than the size of each light source 106. Each first solid section 313 is large enough such that each patterned reflector 312 can be aligned to the corresponding light source 106 and small enough to achieve suitable luminance uniformity and color uniformity.

Each patterned reflector 312 may be formed, for example, by printing (e.g., inkjet printing, screen printing, microprinting, etc.) a pattern with white ink, black ink, metallic ink, or other suitable ink. Each patterned reflector 312 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal.

Figure 11A:
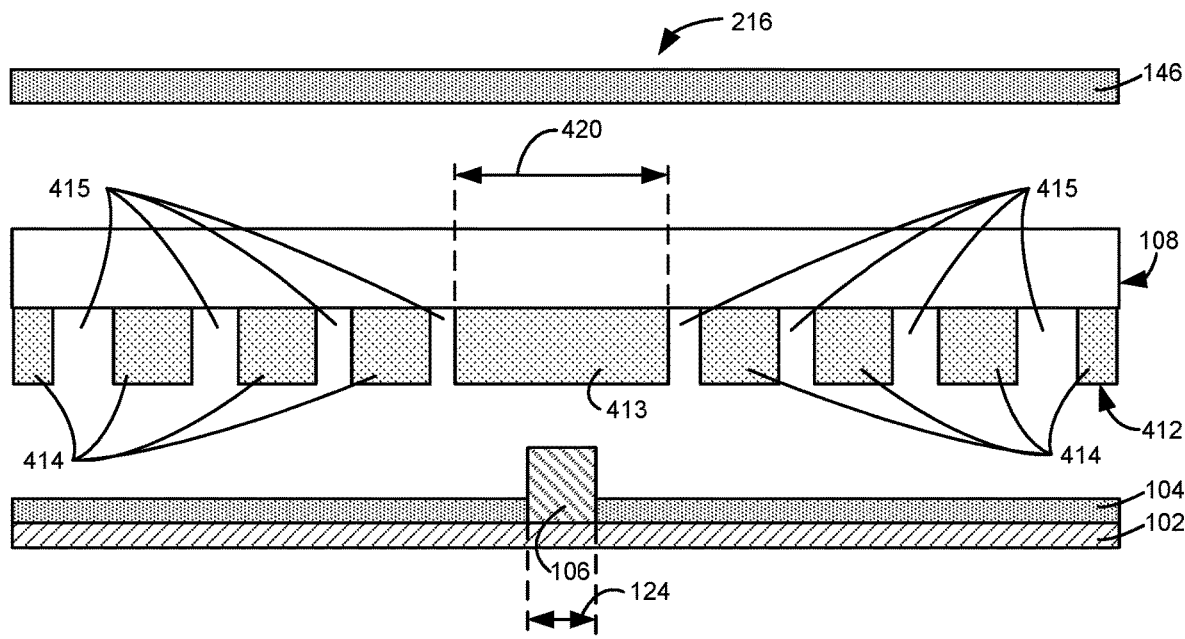
FIGS. 11A and 11B are various views of another exemplary backlight including patterned reflectors.
Figure 11B:
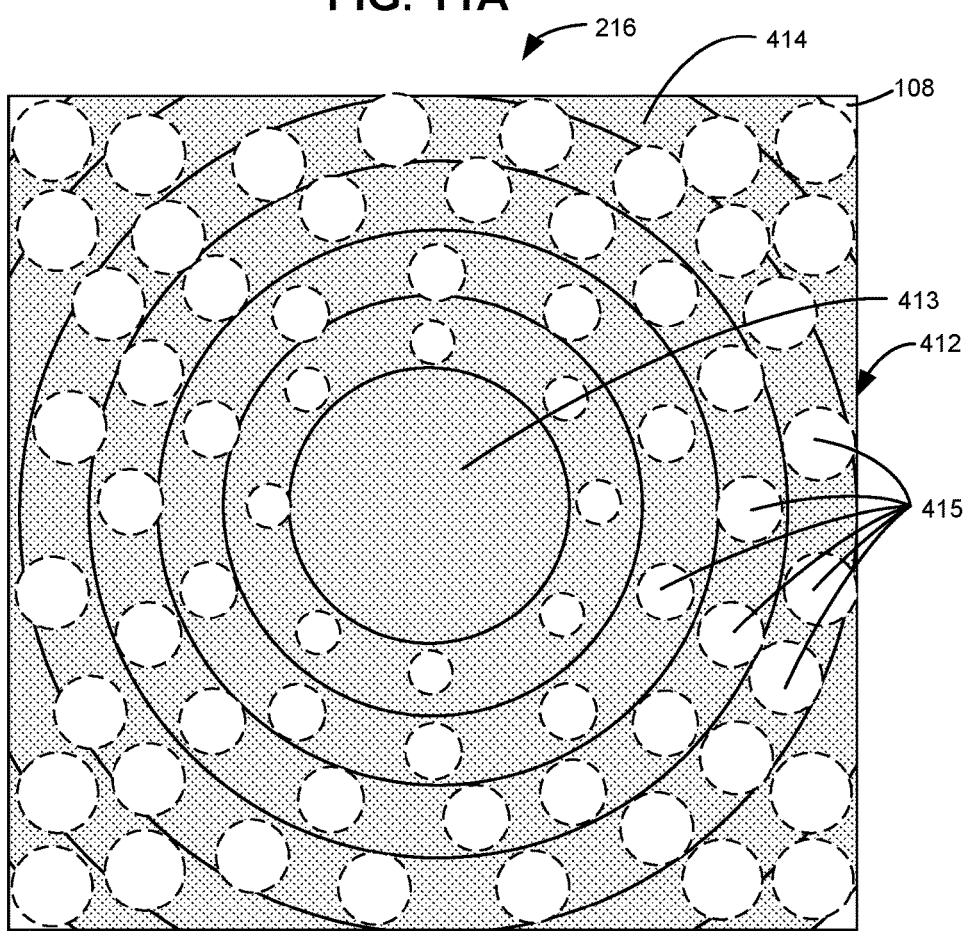

FIGS. 11A and 11B are various views of another exemplary backlight 216. FIG. 11A is a simplified cross-sectional view of backlight 216 and FIG. 11B is a bottom view of a patterned reflector 412 on a light guide plate 108. Backlight 216 is similar to backlight 200 previously described and illustrated with reference to FIG. 3, except that in backlight 216 patterned reflectors 412 are used in place of patterned reflectors 112. Backlight 216 may include a substrate 102, a reflective layer 104, a plurality of light sources 106, and a light guide plate 108 as previously described and illustrated with reference to FIGS. 1A-1C. Backlight 216 also includes the first layer 146 of an optical film stack (not shown) over the light guide plate 108.

Each patterned reflector 412 is on a first surface of the light guide plate 108, where the first surface of the light guide plate faces the plurality of light sources 106. In other embodiments, the first surface of the light guide plate 108 may face away from the plurality of light sources 106 such that the patterned reflectors 412 face away from the plurality of light sources 106. Each patterned reflector 412 includes a first solid section 413, a second section 414 surrounding the first solid section 413, and a plurality of openings 415 extending through the second section 414. As illustrated in FIG. 11B, the openings 415 increase in size (i.e., width or diameter) as a distance from the center of the solid first section 413 increases. Each opening 415 may be circular, elliptical, or another suitable shape. In other embodiments, the features of patterned reflectors 312 previously described and illustrated with reference to FIGS. 10A and 10B may be combined with the features of patterned reflectors 412 to form patterned reflectors including both ring-like openings (e.g., 315) and discrete openings (e.g., 415).

The size L0 (i.e., width or diameter) of each first solid section 413 as indicated at 420 (in a plane parallel to the substrate 102) may be greater than the size (i.e., width or diameter) of each corresponding light source 106 as indicated at 124 (in a plane parallel to the substrate 102). The size 420 of each first solid section 413 may be less than the size 124 of each corresponding light source 106 times a predetermined value. In certain exemplary embodiments, when the size 124 of the each light source 106 is greater than or equal to about 0.5 millimeters, the predetermined value may be about two or about three, such that the size of each first solid section 413 is less than three times the size of each light source 106. When the size 124 of each light source 106 is less than 0.5 millimeters, the predetermined value may be determined by the alignment capability between the light sources 106 and the patterned reflectors 112, such as a predetermined value of about 100, 200, or 300 micrometers. Each first solid section 413 is large enough such that each patterned reflector 412 can be aligned to the corresponding light source 106 and small enough to achieve suitable luminance uniformity and color uniformity.

Each patterned reflector 412 may be formed, for example, by printing (e.g., inkjet printing, screen printing, microprinting, etc.) a pattern with white ink, black ink, metallic ink, or other suitable ink. Each patterned reflector 412 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal.

Figure 12:
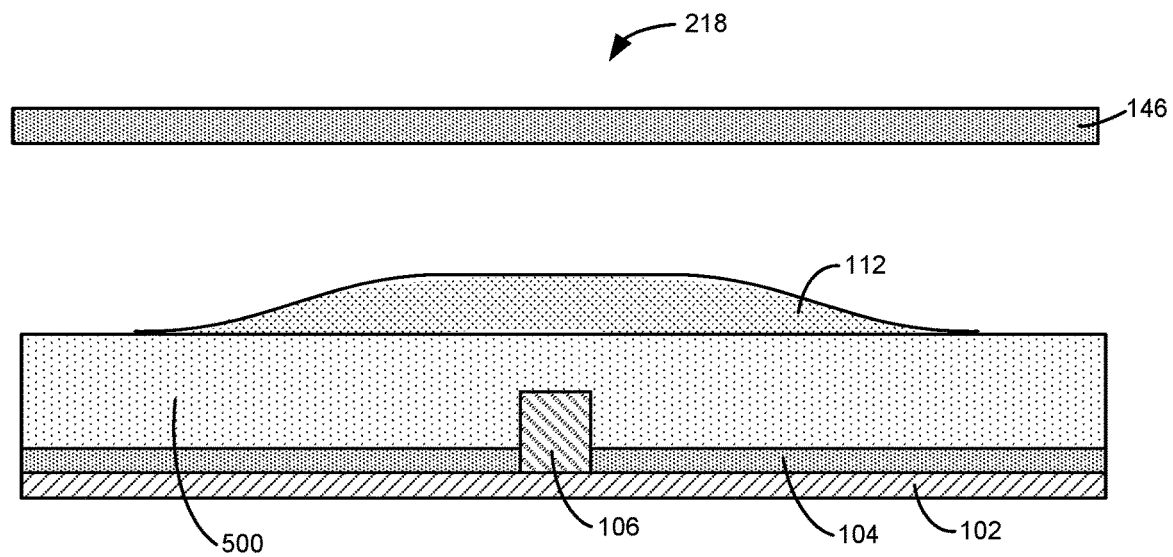
FIG. 12 is a cross-sectional view of an exemplary backlight including an encapsulation layer.

FIG. 12 is a simplified cross-sectional view of an exemplary backlight 218. Backlight 218 may include a substrate 102, a reflective layer 104, a plurality of light sources 106, and a plurality of patterned reflectors 112 as previously described and illustrated with reference to FIGS. 1A-1C. In addition, backlight 218 includes an encapsulation layer 500 between the plurality of patterned reflectors 112 and the reflective layer 104. Backlight 218 also includes the first layer 146 of an optical film stack (not shown) over the plurality of patterned reflectors 112. In this embodiment, each patterned reflector 112 is on a first surface of the encapsulation layer 500, where the first surface of the encapsulation layer faces away from the plurality of light sources 106. A second surface of the encapsulation layer 500 opposite to the first surface is on the reflective layer 104. The encapsulation layer 500 encapsulates each of the plurality of light sources 106.

In this embodiment, the encapsulation layer 500 contacts the upper surface of the reflective layer 104 and lower surface of each patterned reflector 112. The encapsulation layer 500 may include a clear resin material, a silicone, or another suitable material. The clear resin material, silicone, or another suitable material should have a transmittance of over about 60 percent and preferably over about 90 percent. The encapsulation layer 500 may include nano-sized or micro-sized scattering particles.

Figure 13:
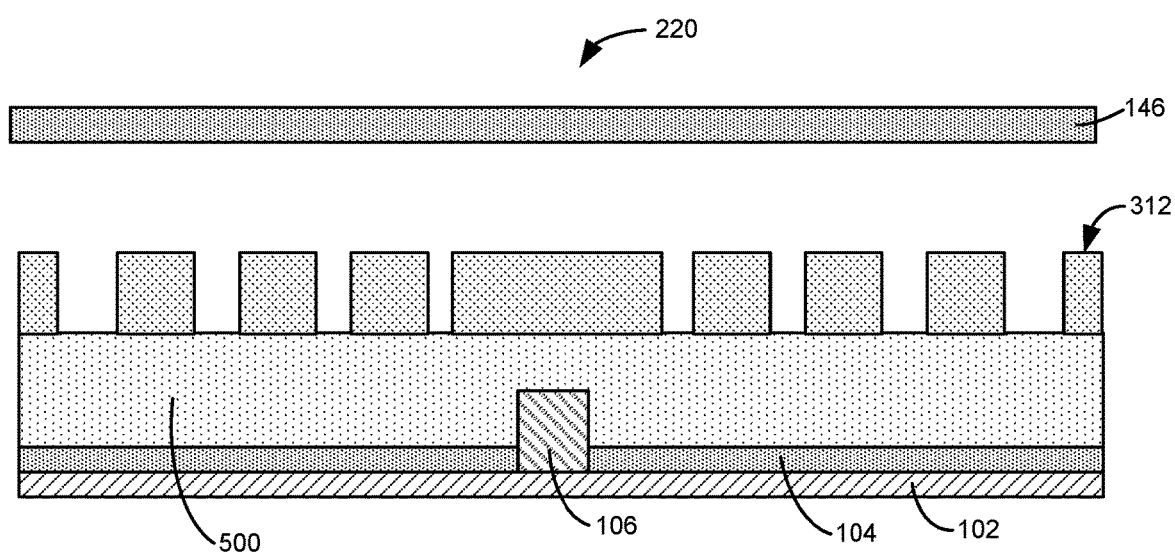
FIG. 13 is a cross-sectional view of another exemplary backlight including an encapsulation layer.

FIG. 13 is a simplified cross-sectional view of another exemplary backlight 220. Backlight 220 is similar to backlight 218 previously described and illustrated with reference to FIG. 12, except that in backlight 220 patterned reflectors 312 are used in place of patterned reflectors 112. In other embodiments, patterned reflectors 412 previously described and illustrated with reference to FIGS. 11A-11B may be used in place of patterned reflectors 312. In this embodiment, each patterned reflector 312 is on a first surface of the encapsulation layer 500, where the first surface of the encapsulation layer faces away from the plurality of light sources 106. A second surface of the encapsulation layer 500 opposite to the first surface is on the reflective layer 104. The encapsulation layer 500 encapsulates each of the plurality of light sources 106.

Figure 14A:
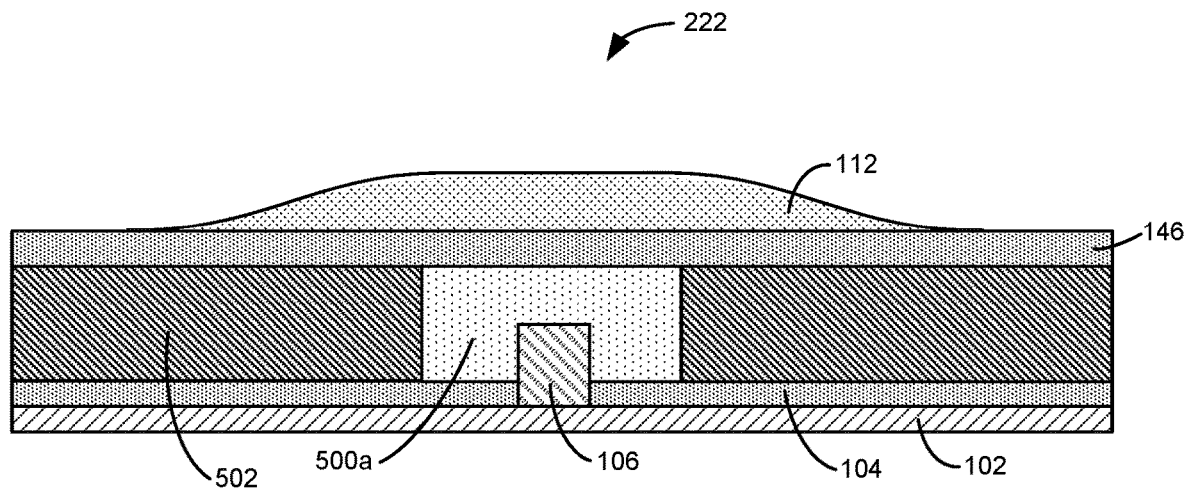
FIGS. 14A and 14B are cross-sectional views of exemplary backlights including a second reflective layer.

FIG. 14A is a simplified cross-sectional view of an exemplary backlight 222. Backlight 222 may include a substrate 102, a first reflective layer 104, a plurality of light sources 106, and a plurality of patterned reflectors 112 as previously described and illustrated with reference to FIGS. 1A-1C. In addition, backlight 222 includes a quantum dot film, diffuser sheet, or diffuser plate 146, a plurality of encapsulation layers 500a, and a second reflective layer 502. In this embodiment, each patterned reflector 112 is on a first surface of the quantum dot film, diffuser sheet, or diffuser plate 146, where the first surface of the quantum dot film, diffuser sheet, or diffuser plate 146 faces away from the plurality of light sources 106. A second surface of the quantum dot film, diffuser sheet, or diffuser plate 146 opposite to the first surface is on the plurality of encapsulation layers 500a and the second reflective layer 502. Each encapsulation layer 500a is on the first reflective layer 104 and encapsulates a corresponding light source 106. The second reflective layer 502 is on the first reflective layer 104.

The second reflective layer 502 is between the quantum dot film, diffuser sheet, or diffuser plate 146 and the first reflective layer 104. In this embodiment, the second reflective layer 502 contacts the upper surface of the first reflective layer 104 and the bottom surface of the quantum dot film, diffuser sheet, or diffuser plate 146. The first reflective layer 104 and the second reflective layer 502 may include different materials or the same material. In certain exemplary embodiments, a reflectance of the second reflective layer 502 is greater than a reflectance of the first reflective layer 104. For example, the reflectance of the second reflective layer 502 may be, for example, greater than about 90, 95, or 99 percent. The second reflective layer 502 includes a plurality of openings, which are aligned with a corresponding light source 106 and filled by a corresponding encapsulation layer 500a. In certain exemplary embodiments, the corresponding light source 106 is at the center of each corresponding encapsulation layer 500a or within twice the size of the light source around the center of each corresponding encapsulation layer 500a.

Each light source 106 may be substantially located in the center of each encapsulation layer 500a. Each encapsulation layer 500a, when viewed from the top, may be a circle, square, hexagon, or polygon in shape. Each encapsulation layer 500a may also be an ellipse, rectangle, or other less symmetrical shape. The walls of each encapsulation layer 500a may be straight (i.e., vertical) as shown in FIG. 14A. In other embodiments, the walls of each encapsulation layer 500a may be sloped, such that each encapsulation layer 500a is larger near the quantum dot film, diffuser sheet, or diffuser plate 146 and smaller near the first reflective layer 104. Each light source 106 may also be located off the center of each encapsulation layer 500a. The transmittance of each patterned reflector 112 closely matches to the location of the corresponding light source 106. Each patterned reflector 112 has a lower transmittance right above the corresponding light source 106 than away from the light source 106. Each patterned reflector 112 may have a shape similar to each encapsulation layer 500a.

Figure 14B:
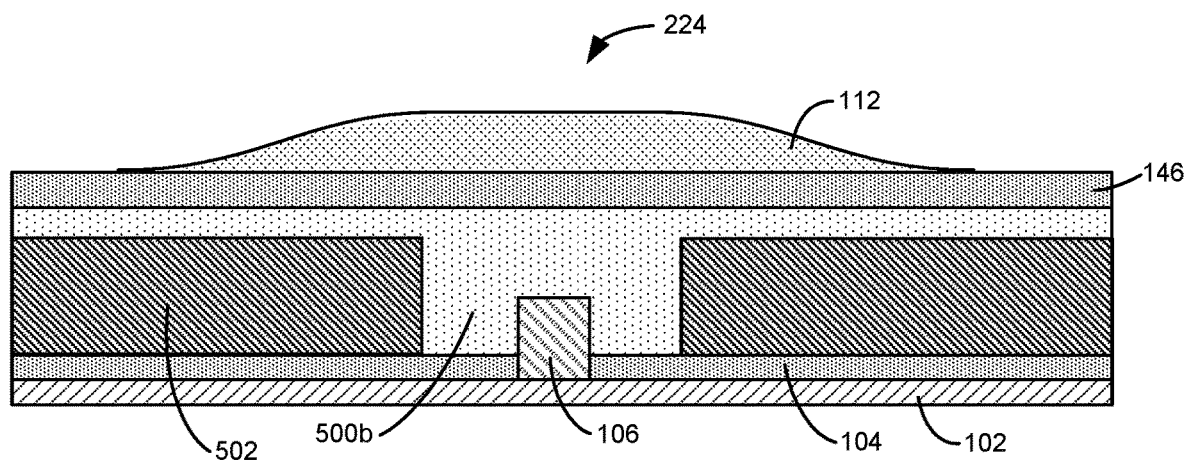

FIG. 14B is a simplified cross-sectional view of an exemplary backlight 224. Backlight 224 is similar to backlight 222 previously described and illustrated with reference to FIG. 14A, except that backlight 224 includes an encapsulation layer 500b in place of the plurality of encapsulation layers 500a. As illustrated in FIG. 14B, the encapsulation layer 500b is between the upper surface of the second reflective layer 502 and the lower surface of the quantum dot film, diffuser sheet, or diffuser plate 146 and fully fills each opening of the second reflective layer 502 around each light source 106. Thus, the encapsulation layer 500b extends over the second reflective layer 502.

Figure 15A:
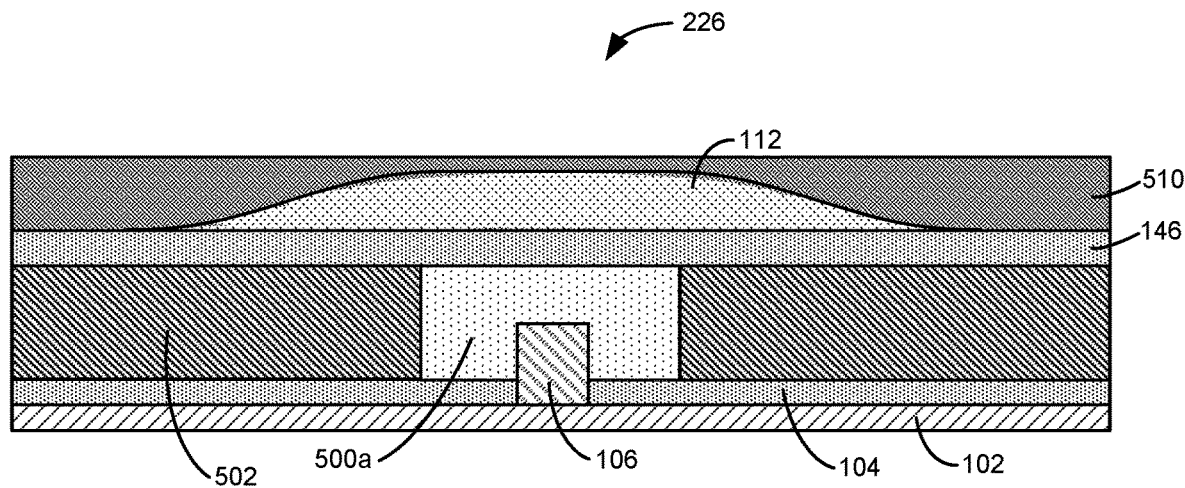
FIGS. 15A and 15B are cross-sectional views of exemplary backlights including a further encapsulation layer.

FIG. 15A is a simplified cross-sectional view of an exemplary backlight 226. Backlight 226 is similar to backlight 222 previously described and illustrated with reference to FIG. 14A, except that backlight 226 includes a further encapsulation layer 510. Encapsulation layer 510 is on the quantum dot film, diffuser sheet, or diffuser plate 146 and encapsulates each of the plurality of patterned reflectors 112. Encapsulation layer 510 may be an optically clear adhesive, a clear resin, a diffusive resin, or another suitable material. Encapsulation layer 510 may be thermally curable, UV curable, or pressure sensitive. While encapsulation layer 510 fully encapsulates each patterned reflector 112 in the embodiment illustrated in FIG. 15A, in other embodiments encapsulation layer 510 may partially encapsulate each patterned reflector 112 such that a portion of each patterned reflector 112 remains exposed. Encapsulation layer 510 may prevent damage (e.g., scratches) to each patterned reflector 112 during fabrication of the backlight 226. Encapsulation layer 510 may also improve the adhesion of each patterned reflector 112 to the quantum dot film, diffuser sheet, or diffuser plate 146.

Figure 15B:
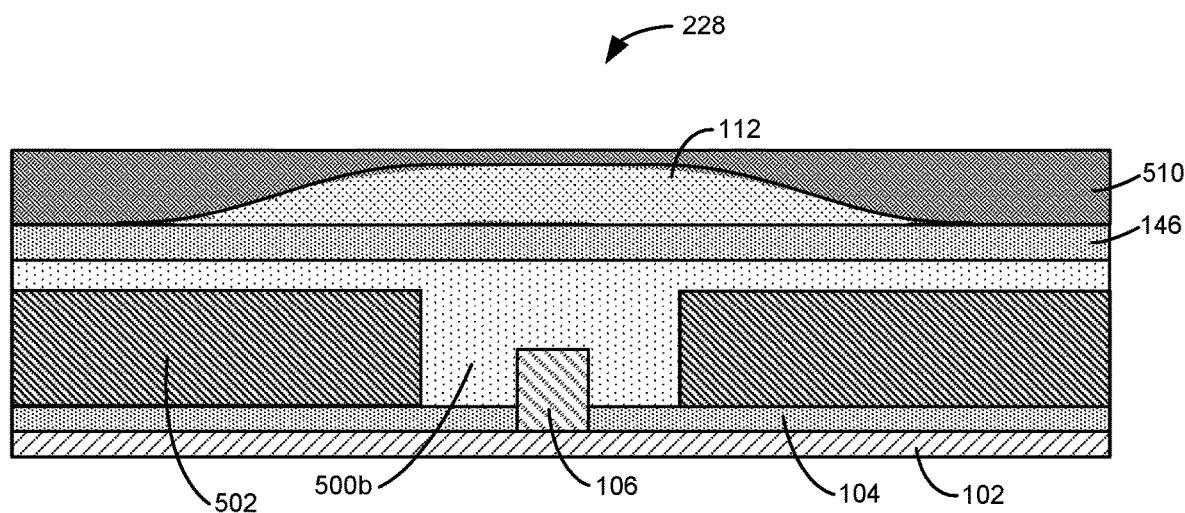

FIG. 15B is a simplified cross-sectional view of an exemplary backlight 228. Backlight 228 is similar to backlight 224 previously described and illustrated with reference to FIG. 14B, except that backlight 228 includes the further encapsulation layer 510 previously described and illustrated with reference to FIG. 15A.

Figure 16:
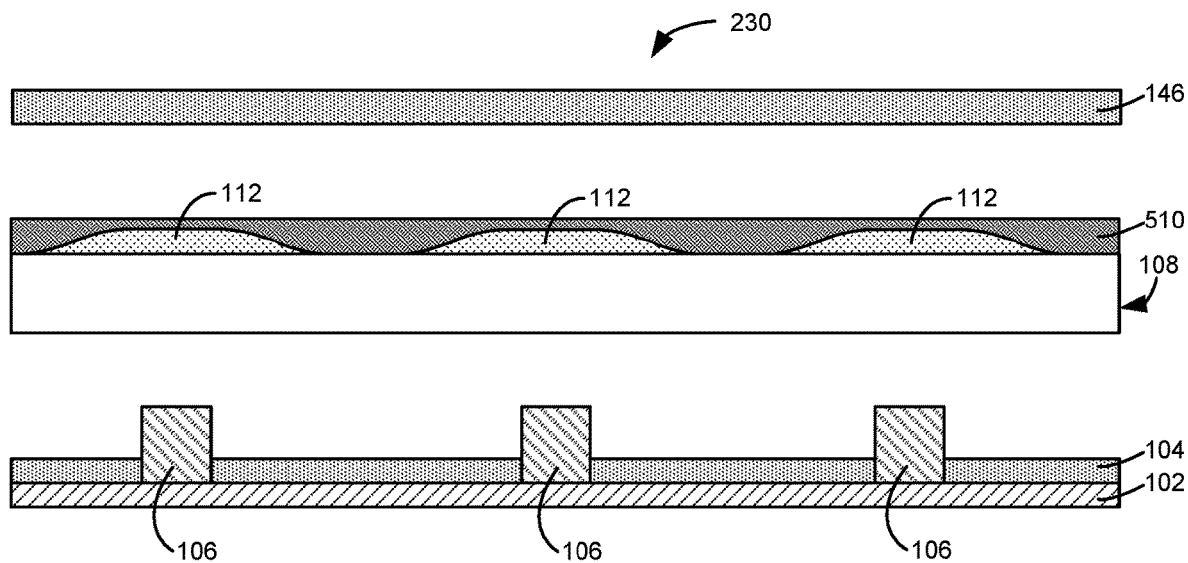
FIG. 16 is a cross-sectional view of another exemplary backlight including an encapsulation layer.

FIG. 16 is a simplified cross-sectional view of another exemplary backlight 230. Backlight 230 is similar to backlight 100 previously described and illustrated with reference to FIGS. 1A-1C, except that backlight 230 include an encapsulation layer 510. Backlight 230 also includes the first layer 146 of an optical film stack (not shown) over the encapsulation layer 510. In this embodiment, the encapsulation layer 510 is on the light guide plate 108 and encapsulates each of the plurality of patterned reflectors 112. In other embodiments, the plurality of patterned reflectors 312 previously described and illustrated with reference to FIGS. 10A-10B or the plurality of patterned reflectors 412 previously described and illustrated with reference to FIGS. 11A-11B may be used in place of the plurality of patterned reflectors 112. Encapsulation layer 510 may prevent damage (e.g., scratches) to each patterned reflector 112 due to potential contact with the quantum dot film, diffuser sheet, or diffuser plate 146 during fabrication of the backlight 230. Encapsulation layer 510 may also improve the adhesion of each patterned reflector 112 to the light guide plate 108.

Figure 17:
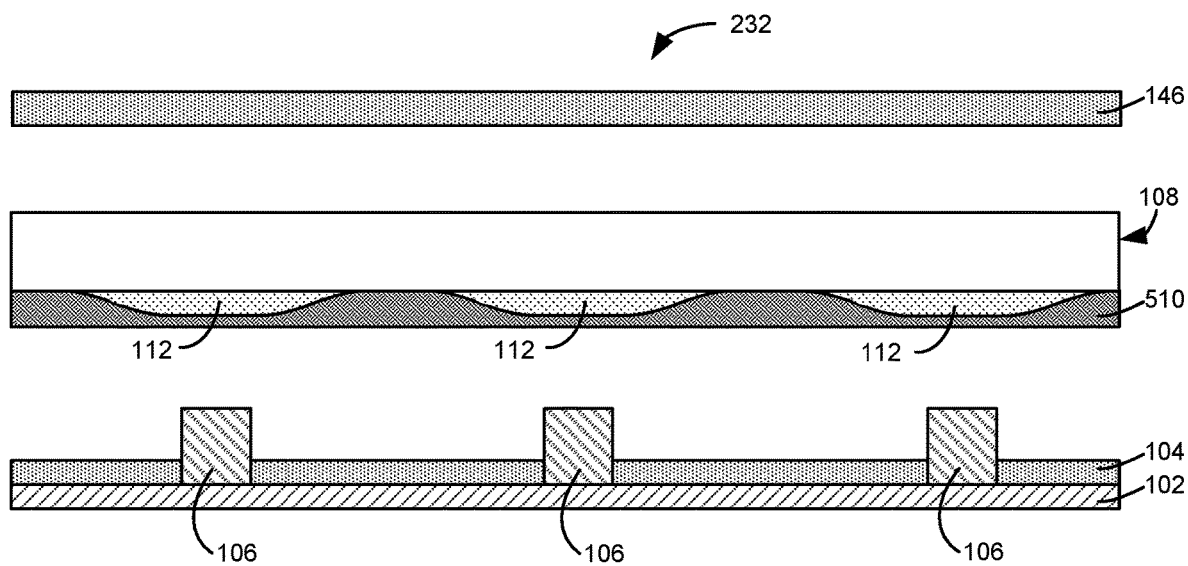
FIG. 17 is a cross-sectional view of another exemplary backlight including an encapsulation layer.

FIG. 17 is a simplified cross-sectional view of another exemplary backlight 232. Backlight 232 is similar to backlight 200 previously described and illustrated with reference to FIG. 3, except that backlight 232 includes an encapsulation layer 510. In this embodiment, the encapsulation layer 510 is on the lower surface of the light guide plate 108 and encapsulates each of the plurality of patterned reflectors 112. In other embodiments, the plurality of patterned reflectors 312 previously described and illustrated with reference to FIGS. 10A-10B or the plurality of patterned reflectors 412 previously described and illustrated with reference to FIGS. 11A-11B may be used in place of the plurality of patterned reflectors 112. In this embodiment, encapsulation layer 510 may prevent damage (e.g., scratches) to each patterned reflector 112 due to potential contact with the light sources 106 during fabrication of the backlight 232.

Figure 18:
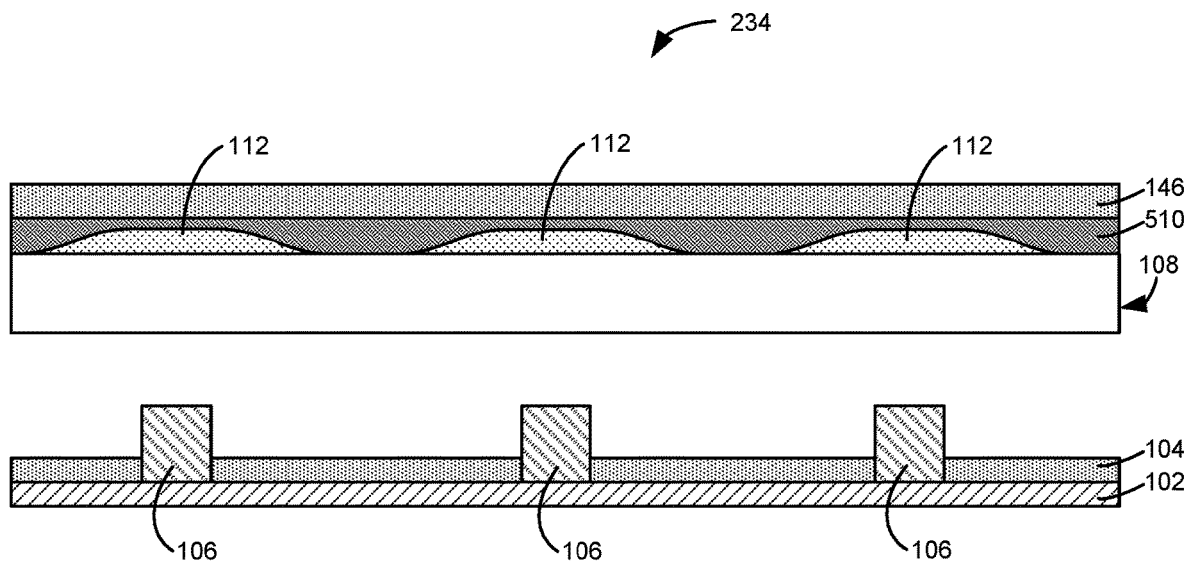
FIG. 18 is a cross-sectional view of an exemplary backlight including an encapsulation layer bonded to a first layer of an optical film stack.

FIG. 18 is a simplified cross-sectional view of an exemplary backlight 234. Backlight 234 is similar to backlight 230 previously described and illustrated with reference to FIG. 16, except that in backlight 234 the encapsulation layer 510 is bonded to the first layer 146 of the optical film stack. The encapsulation layer 510 may be directly bonded to the first layer 146 of the optical film stack or bonded to the first layer 146 of the optical film stack via an adhesive material or another suitable material. By bonding the encapsulation layer 510 to the first layer 146 of the optical film stack, the overall thickness of the backlight 234 may be reduced and/or the mechanical stability of the backlight 234 may be improved.

Figure 19:
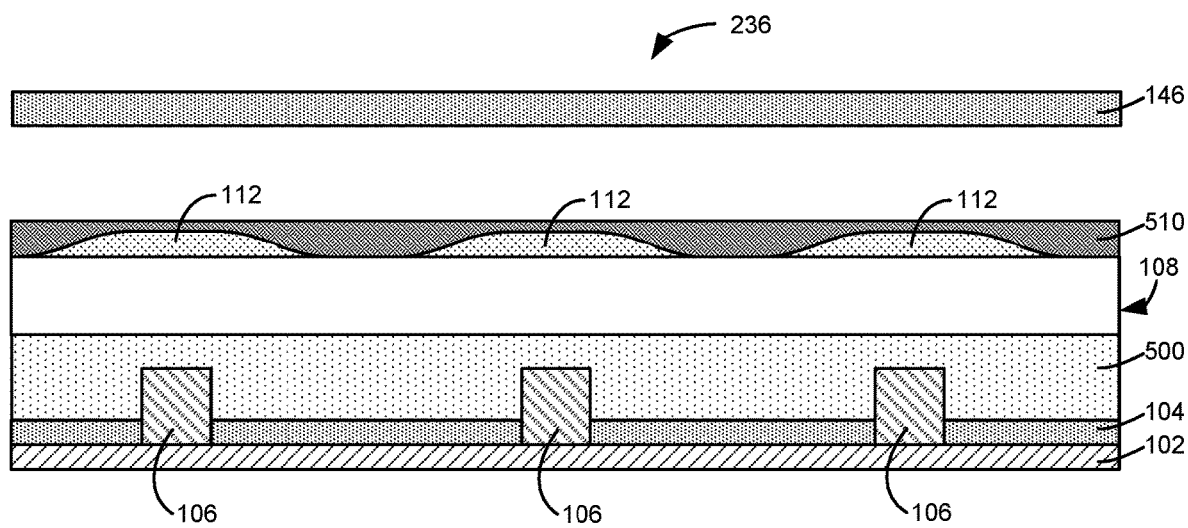
FIG. 19 is a cross-sectional view of an exemplary backlight including a light guide plate bonded to an encapsulation layer.

FIG. 19 is a simplified cross-sectional view of an exemplary backlight 236. Backlight 236 is similar to backlight 230 previously described and illustrated with reference to FIG. 16, except that backlight 236 includes an encapsulation layer 500 as previously described and illustrated with reference to FIG. 12 and the light guide plate 108 is bonded to the encapsulation layer 500. The light guide plate 108 may be directly bonded to the encapsulation layer 500 or bonded to the encapsulation layer 500 via an adhesive material or another suitable material. By bonding the light guide plate 108 to the encapsulation layer 500, the overall thickness of the backlight 236 may be reduced and/or the mechanical stability of the backlight 236 may be improved.

Figure 20:
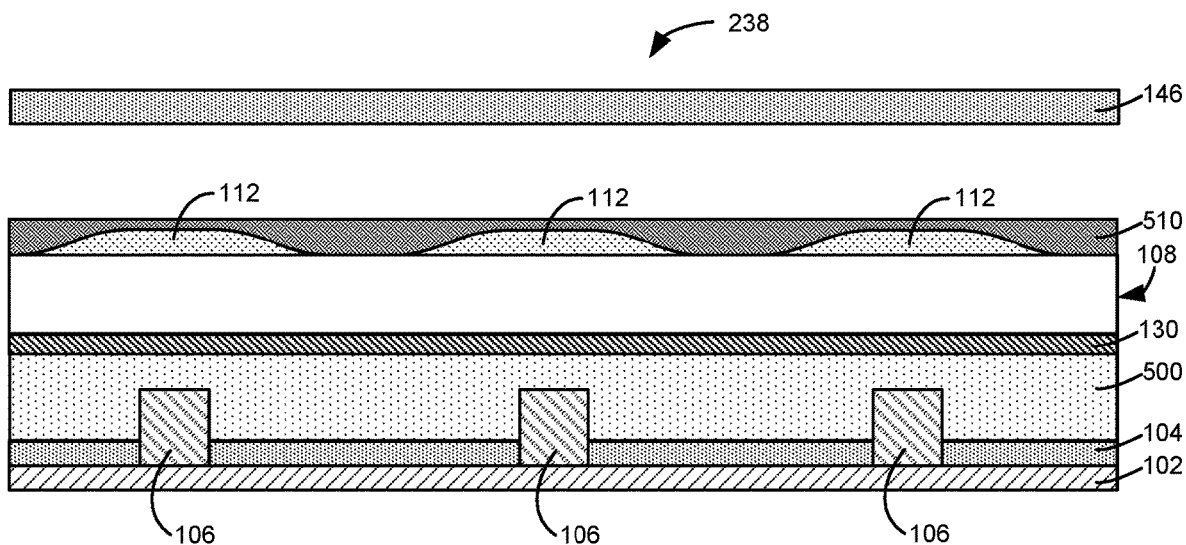
FIG. 20 is a cross-sectional view of an exemplary backlight including a diffusive layer bonded to an encapsulation layer.

FIG. 20 is a simplified cross-sectional view of an exemplary backlight 238. Backlight 238 is similar to backlight 236 previously described and illustrated with reference to FIG. 19, except that backlight 238 includes a diffusive layer 130 as previously described and illustrated with reference to FIG. 4 bonded between the light guide plate 108 and the encapsulation layer 500.

Figure 21:
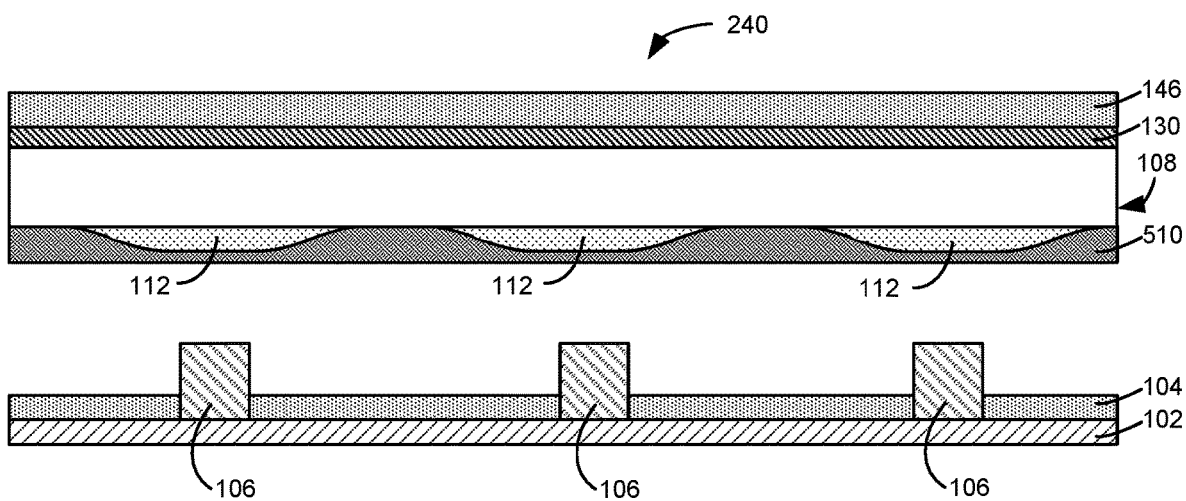
FIG. 21 is a cross-sectional view of an exemplary backlight including a diffusive layer bonded to a first layer of an optical film stack.

FIG. 21 is a simplified cross-sectional view of an exemplary backlight 240. Backlight 240 is similar to backlight 232 previously described and illustrated with reference to FIG. 17, except that backlight 240 includes a diffusive layer 130 bonded between the light guide plate 108 and the first layer 146 of the optical film stack.

Figure 22:
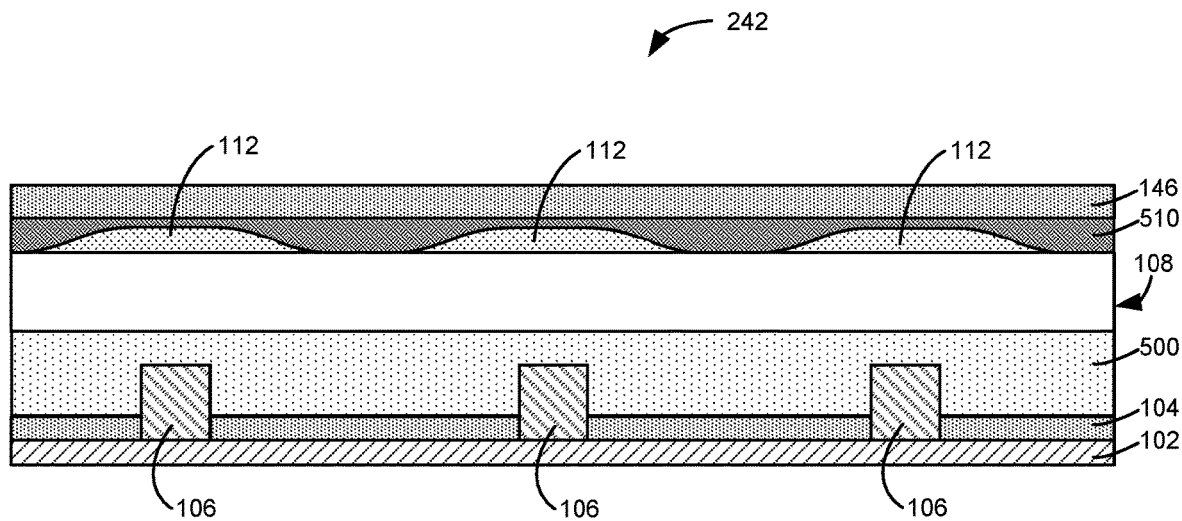
FIG. 22 is a cross-sectional view of an exemplary backlight including a light guide plate bonded to an encapsulation layer and a further encapsulation layer bonded to a first layer of an optical film stack.

FIG. 22 is a simplified cross-sectional view of an exemplary backlight 242. Backlight 242 is similar to backlight 236 previously described and illustrated with reference to FIG. 19, except that in backlight 242 the encapsulation layer 510 is bonded to the first layer 146 of the optical film stack. By bonding the light guide plate 108 to the encapsulation layer 500 and by bonding the encapsulation layer 510 to the first layer 146 of the optical film stack, the overall thickness of the backlight 242 may be reduced and/or the mechanical stability of the backlight 242 may be improved.

Figure 23:
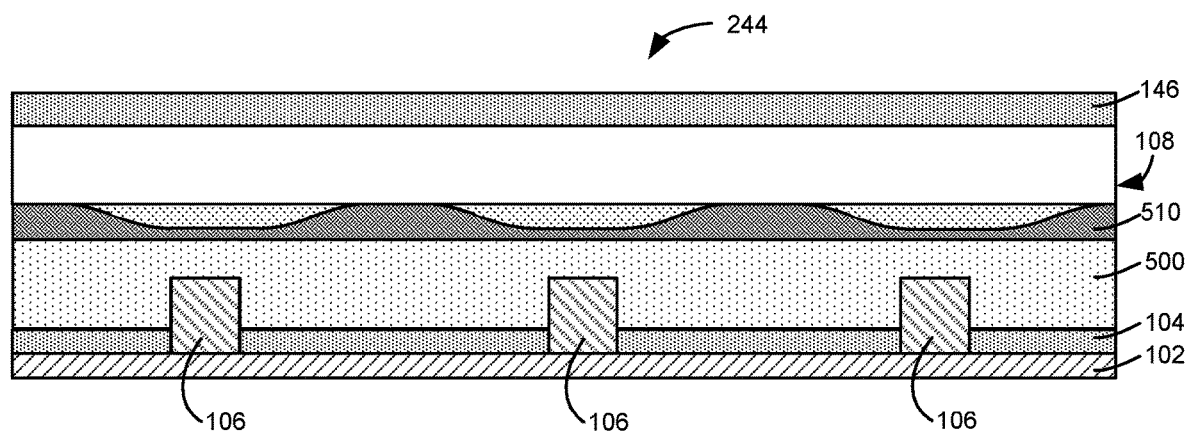
FIG. 23 is a cross-sectional view of an exemplary backlight including a light guide plate bonded to a first layer of an optical film stack and a further encapsulation layer bonded to an encapsulation layer.

FIG. 23 is a simplified cross-sectional view of an exemplary backlight 244. Backlight 244 is similar to backlight 232 previously described and illustrated with reference to FIG. 17, except that backlight 244 includes an encapsulation layer 500, the light guide plate 108 is bonded to the first layer 146 of the optical film stack, and the encapsulation layer 510 is bonded to the encapsulation layer 500. By bonding the light guide plate 108 to the first layer 146 of the optical film stack and by bonding the encapsulation layer 510 to the encapsulation layer 500, the overall thickness of the backlight 244 may be reduced and/or the mechanical stability of the backlight 244 may be improved. Similar to FIG. 21, the light guide plate 108 may have a diffusive layer 130 on the upper surface and be bonded to the first layer 146 of the optical film stack through the diffusive layer 130, while the encapsulation layer 510 is bonded to the encapsulation layer 500.

Figure 24:
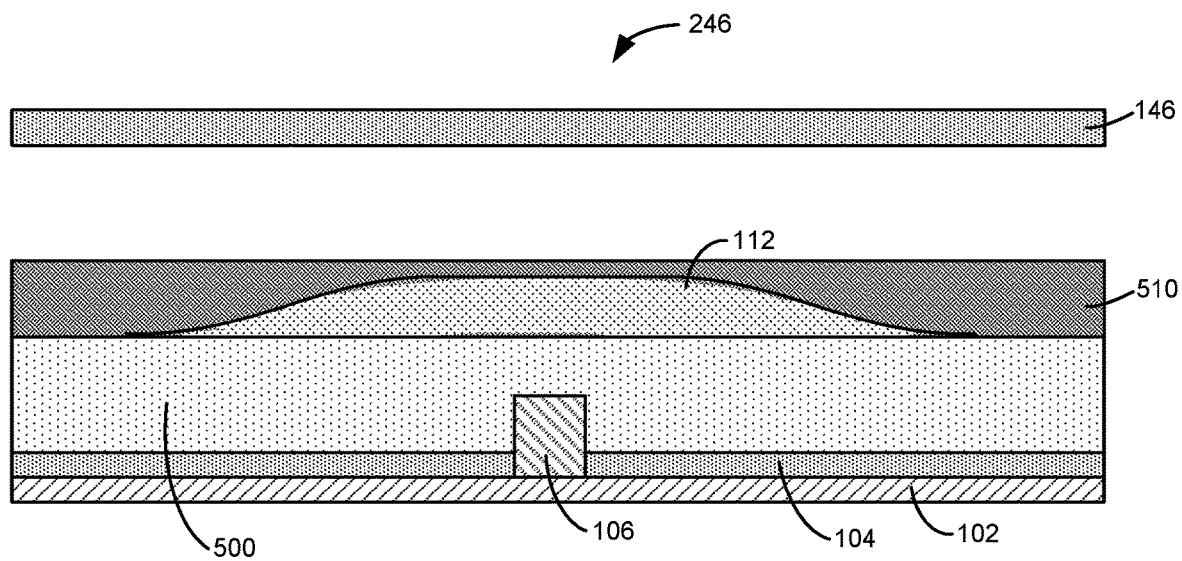
FIG. 24 is a cross-sectional view of another exemplary backlight including an encapsulation layer.

FIG. 24 is a simplified cross-sectional view of another exemplary backlight 246. Backlight 246 is similar to backlight 218 previously described and illustrated with reference to FIG. 12, except that backlight 246 includes an encapsulation layer 510. Encapsulation layer 510 is on the encapsulation layer 500 and encapsulates each of the plurality of patterned reflectors 112. In addition to other advantages previously described, encapsulation layer 510 may improve the adhesion of each patterned reflector 112 to encapsulation layer 500.

Figure 25:
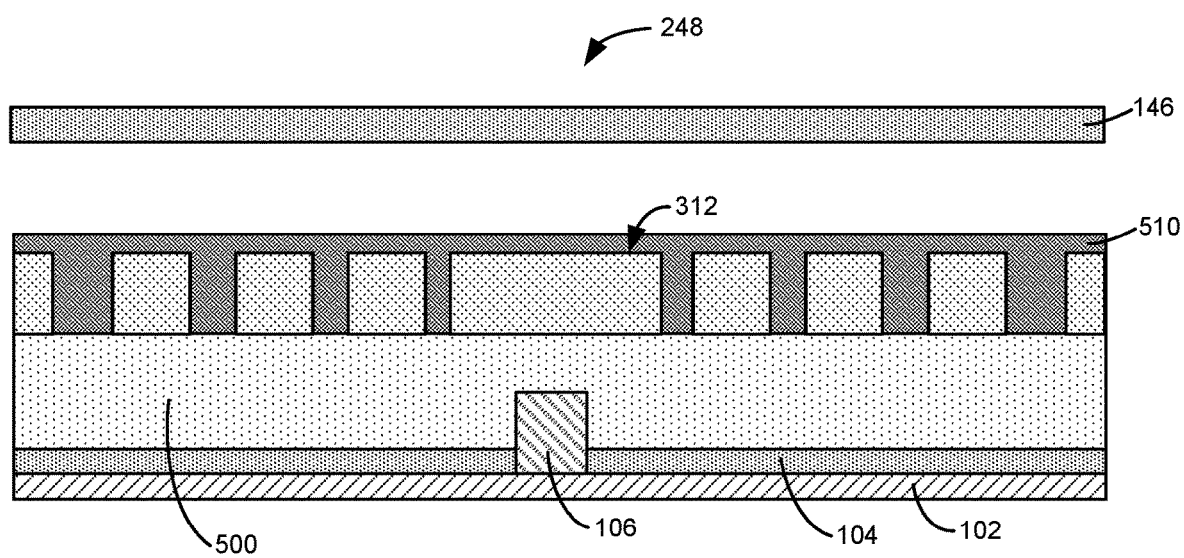
FIG. 25 is a cross-sectional view of another exemplary backlight including an encapsulation layer.

FIG. 25 is a simplified cross-sectional view of another exemplary backlight 248. Backlight 248 is similar to backlight 220 previously described and illustrated with reference to FIG. 13, except that backlight 248 includes an encapsulation layer 510. Encapsulation layer 510 is on the encapsulation layer 500 and encapsulates each of the plurality of patterned reflectors 312. In other embodiments, the plurality of patterned reflectors 312 may be replaced by the plurality of patterned reflectors 412 previously described and illustrated with reference to FIGS. 11A-11B, and the plurality of patterned reflectors 412 may be encapsulated by the encapsulation layer 510. In addition to other advantages previously described, encapsulation layer 510 may improve the adhesion of each patterned reflector 312 to encapsulation layer 500.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A backlight comprising:
a substrate;
a plurality of light sources proximate the substrate, each light source comprising a size measured in a plane parallel to the substrate;
a first reflective layer on the substrate; and
a plurality of patterned reflectors over the plurality of light sources, each patterned reflector aligned with a corresponding light source and comprising a thickness profile, the thickness profile comprising a substantially flat section and a curved section extending from and surrounding the substantially flat section, the substantially flat section varying in thickness by no more than plus or minus about 20 percent, and the substantially flat section comprising a size in a plane parallel to the substrate equal to or greater than the size of each light source.

2. The backlight of claim 1, further comprising:
a light guide plate proximate the plurality of light sources, wherein the plurality of patterned reflectors are on a first surface of the light guide plate.

3. The backlight of claim 2, further comprising:
a diffusive layer on a second surface of the light guide plate opposite to the first surface.

4. The backlight of claim 3, further comprising:
a first layer of an optical film stack,
wherein the diffusive layer is bonded to the first layer of the optical film stack.

5. The backlight of claim 3, further comprising:
at least one encapsulation layer on the first reflective layer and encapsulating the plurality of light sources,
wherein the diffusive layer is bonded to the at least one encapsulation layer.

6. The backlight of claim 2, further comprising:
a linear or circular, prismatic, or lenticular lens on a second surface of the light guide plate opposite to the first surface.

7. The backlight of claim 1, further comprising:
at least one encapsulation layer on the first reflective layer and encapsulating the plurality of light sources,
wherein the plurality of patterned reflectors are on the at least one encapsulation layer.

8. The backlight of claim 7, further comprising:
a second reflective layer on the first reflective layer, the second reflective layer comprising a plurality of openings, each opening aligned with a corresponding light source,
wherein the at least one encapsulation layer comprises a plurality of encapsulation layers, each encapsulation layer filling a corresponding opening of the plurality of openings.

9. The backlight of claim 7, further comprising:
a second reflective layer on the first reflective layer, the second reflective layer comprising a plurality of openings, each opening aligned with a corresponding light source,
wherein the at least one encapsulation layer extends over the second reflective layer and fully fills each of the plurality of openings.

10. The backlight of claim 1, wherein the size of each substantially flat section of each of the plurality of patterned reflectors is less than about three times the size of each light source of the plurality of light sources.

11. The backlight of claim 1, wherein each substantially flat section of each of the plurality of patterned reflectors varies in thickness by no more than plus or minus about 10 percent.

12. The backlight of claim 1, wherein a ratio L1/P is within a range between about 0.45 and 1, where L1 is a size of each patterned reflector of the plurality of patterned reflectors in a plane parallel to the substrate and P is a pitch of the plurality of light sources.

13. The backlight of claim 1, wherein the plurality of patterned reflectors comprise a metallic ink.

14. The backlight of claim 1, further comprising:
an encapsulation layer encapsulating the plurality of patterned reflectors.

15. A backlight comprising:
a substrate;
a plurality of light sources proximate the substrate, each light source comprising a size measured in a plane parallel to the substrate;
a first reflective layer on the substrate; and
a plurality of patterned reflectors over the plurality of light sources, each patterned reflector aligned with a corresponding light source and comprising a first solid section, a plurality of second solid sections, each second solid section completely surrounding the first solid section, and a plurality of open sections interleaved with the plurality of second solid sections, the first solid section comprising a size in a plane parallel to the substrate equal to or greater than the size of each light source.

16. The backlight of claim 15, further comprising:
a light guide plate proximate the plurality of light sources,
wherein the plurality of patterned reflectors are on a first surface of the light guide plate.

17. The backlight of claim 15, further comprising:
at least one encapsulation layer on the first reflective layer and encapsulating the plurality of light sources,
wherein the plurality of patterned reflectors are on the at least one encapsulation layer.

18. The backlight of claim 15, wherein the size of each first solid section of each of the plurality of patterned reflectors is less than about three times the size of each light source of the plurality of light sources.

19. A backlight comprising:
a substrate;
a plurality of light sources proximate the substrate, each light source comprising a size measured in a plane parallel to the substrate;
a first reflective layer on the substrate; and
a plurality of patterned reflectors over the plurality of light sources, each patterned reflector aligned with a corresponding light source and comprising a solid first section, a second section surrounding the solid first section, and a plurality of separate openings extending through the second section, the openings increasing in size as a distance from a center of the solid first section increases, and the solid first section comprising a size in a plane parallel to the substrate equal to or greater than the size of each light source.

20. The backlight of claim 19, further comprising:
a light guide plate proximate the plurality of light sources,
wherein the plurality of patterned reflectors are on a first surface of the light guide plate.

21. The backlight of claim 19, further comprising:
at least one encapsulation layer on the first reflective layer and encapsulating the plurality of light sources,
wherein the plurality of patterned reflectors are on the at least one encapsulation layer.

22. The backlight of claim 19, wherein the size of each solid first section of each of the plurality of patterned reflectors is less than about three times the size of each light source of the plurality of light sources.

23. The backlight of claim 19, further comprising:
an encapsulation layer encapsulating the plurality of patterned reflectors.

24. A backlight comprising:
a substrate;
a plurality of light sources proximate the substrate;
a light guide plate proximate the plurality of light sources; and
a diffusive layer on the light guide plate, the diffusive layer comprising hollow glass beads,
wherein the diffusive layer comprises a haze of at least about 99 percent.

25. The backlight of claim 24, further comprising:
a further light guide plate proximate the light guide plate; and
a plurality of patterned reflectors on a surface of the further light guide plate.

* * * * *